United States Patent
Blackwell et al.

(10) Patent No.: US 7,296,835 B2
(45) Date of Patent: Nov. 20, 2007

(54) ROBOTIC HAND AND ARM APPARATUS

(75) Inventors: Trevor Blackwell, Los Altos, CA (US); Scott Wiley, Los Altos, CA (US)

(73) Assignee: Anybots, Inc., Mountain View, CA (US)

( * ) Notice: Subject to any disclaimer, the term of this patent is extended or adjusted under 35 U.S.C. 154(b) by 101 days.

(21) Appl. No.: 11/202,843

(22) Filed: Aug. 11, 2005

(65) Prior Publication Data
US 2007/0035143 A1 Feb. 15, 2007

(51) Int. Cl.
*B25J 15/10* (2006.01)
(52) U.S. Cl. .................. 294/111; 294/106; 294/907; 901/36; 901/46
(58) Field of Classification Search ............. 294/106, 294/111, 907; 901/33, 34, 36, 39, 46; 623/61, 623/62, 64
See application file for complete search history.

(56) References Cited

U.S. PATENT DOCUMENTS

| | | | |
|---|---|---|---|
| 984,179 A | 2/1911 | Aydt | |
| 1,225,415 A | 5/1917 | Cronemiller | |
| 1,285,617 A | 11/1918 | Caron | |
| 2,598,593 A | 5/1952 | Parker | |
| 2,669,727 A | 2/1954 | Opuszenski | |
| 2,696,010 A * | 12/1954 | Robinson | 623/26 |
| 2,706,296 A | 4/1955 | Fletcher et al. | |
| 2,847,678 A | 8/1958 | Opuszenski | |
| 2,859,450 A | 11/1958 | Becker | |
| 3,521,303 A | 7/1970 | Yakobson et al. | |
| 4,094,016 A | 6/1978 | Eroyan | |
| 4,246,661 A | 1/1981 | Pinson | |
| 4,332,038 A | 6/1982 | Freeland | |
| 4,351,553 A | 9/1982 | Rovetta et al. | |
| 4,575,297 A | 3/1986 | Richter | |
| 4,643,473 A * | 2/1987 | Douglas | 294/111 |
| 4,685,929 A | 8/1987 | Monestier | |
| 4,740,126 A | 4/1988 | Richter | |
| 4,746,894 A | 5/1988 | Zeldman | |
| 4,821,594 A | 4/1989 | Rosheim et al. | |
| 4,834,443 A | 5/1989 | Crowder et al. | |
| 4,955,918 A | 9/1990 | Lee | |
| 4,980,626 A | 12/1990 | Hess et al. | |
| 4,982,611 A | 1/1991 | Lorenz et al. | |
| 5,200,679 A * | 4/1993 | Graham | 318/568.16 |
| 5,280,981 A | 1/1994 | Schulz | |
| 5,378,033 A | 1/1995 | Guo et al. | |
| 5,647,723 A | 7/1997 | Rush | |
| 5,967,580 A | 10/1999 | Rosheim | |
| 6,658,962 B1 | 12/2003 | Rosheim | |
| 6,913,627 B2 * | 7/2005 | Matsuda | 623/64 |

* cited by examiner

*Primary Examiner*—Dean J Kramer
(74) *Attorney, Agent, or Firm*—Intellectual Property Law Group LLP; Otto O. Lee; Juneko Jackson

(57) ABSTRACT

A robotic hand and arm where the fingers are driven by rotational motors with drums, and pulled with cables using rolling friction. The hand extends into a robotic arm through a wrist wherein the wrist is controlled by pneumatic cylinders. Each finger preferably is provided with four manufactured parts and a single pulley. The thumb is provided with three pulleys for independent distal movement. Cables wraps around or over pulleys, eliminating tight bends. A glove is provided about the robotic hand which provides a compressive, liquid resistant membrane.

19 Claims, 21 Drawing Sheets

ROBOTIC HAND AND ARM APPARATUS

BACKGROUND OF THE INVENTION

1. Field of Invention

The present invention relates generally to a robotic or artificial arm and more particularly a robotic hand and fingers, lightweight and dexterous, having human like manipulation.

2. Background Art

Robotic arms, hands and fingers have been in use and disclosed by others with the usual mechanics using metal, bearings, cables, and pulleys. The use of robotic hands in various applications is apparent today. The need for robotic arms and hands has been prevalent in areas such as prosthetics, space exploration or other work environments where a human hand is not possible or desired. In many work environments, or for the sheer realism, human like manipulation is needed for conducting tasks which require precision, for instance in grasping objects with the necessary strength and at the same having sufficient control and dexterity.

Most robotic hands have a plurality of digits, the little, ring, middle, index and thumb. Each finger is segmented into phalanges, where the tip is the distal phalange, followed by the middle (or medial) phalange, the proximal phalange and then the metacarpal at the knuckle. In constructing robotic hands with the detail, functionality and realism of human hands, the assembly can be highly complex and difficult to maintain. Servicing in turn is both difficult and often. In addition, certain assemblies result in a bulky design and also become too costly in both parts, manufacturing and as mentioned servicing.

Many robot hands have been disclosed as driven with pneumatics or electric motors. Other robot hands similar to such mechanisms are being developed by such entities as Utah/MIT, Stanford/JPL, Okada, Barrett, Bologna University, DLR German Aerospace Center, LMS, DIST Genova, Robonaut NASA, Tokyo and Karlsruhe University, Ultralight research center of Karlsruhe, Gifu University Japan. Others have incorporated tactile capacitive sensing, such as Pressure Profile Systems Inc. onto robot hands. However, none of these attempts have addressed or solved the issues of providing a robot hand and arm of a compact, inexpensive, light weight product having sufficient power and necessary control.

Prior attempts discussed above have the disadvantages and problems associated with fingers being too complex and difficult to build. In addition, power and dexterity is insufficient and cost for manufacturing such devices is much too high. Forearms have been designed but are too bulky and large to work on a robot. Simplicity in the mechanism for the movement in the fingers of the robot hand is missing. In addition, the use of sliding friction leads to cable going slack and other associated problems such as jerky motions.

Therefore, there is a need for a solution to such problems such that a robot arm is both efficient and easier to manufacture, having sufficient power and dexterity in movement in various directions and at the same time provide for realistic and humanly realistic movement. It is accordingly a principal object of the invention to provide for robot hand with the power, speed, dexterity, control and feedback of a human hand at a minimal cost.

SUMMARY OF THE INVENTION

An embodiment of the present invention is a robotic arm and in particular a robotic hand using no sliding friction except through a cable housing, but instead operates with rolling friction using cables. The preferred embodiment of the present invention provides for the robotic hand wherein the drum drive, cable housings, rolling friction, one pulley, ligament distal phalange, are designed to work together.

One object of the present invention is to provide for a low cost and easily assemble robotic hand, for instance the preferred embodiment provides for only four manufactured parts for each finger of the robot hand. In the preferred embodiment, each finger employs one pulley, three pins, eight bearings and seven cables.

Another object of the present invention is to provide for a cable housing that is compressible allowing for compliance at the finger tips and the cable housing prevents the fingers from moving as the wrist moves Yet another object of the present invention is to provide for removable fingers for servicing and providing bearings on the outside of the knuckle that allow the cables to pass through the center of the finger.

In addition, the preferred embodiment has no screw thread and no fasteners. An entire finger can be snapped together in the preferred embodiment of the present invention.

Another object of the invention provides for limited parts and easy assemble; fingers for instance, only use one pulley; cables wrap around the pulleys eliminating the need for additional pulleys or tight bends; the thumb may use three pulleys for additional capabilities such as independent distal movement.

Another object of the present invention allows for the use of larger and stronger cables for greater grip strength of the hand.

Yet another object of the present invention allows for a greater life of the cables in that the rolling friction allows for gentle bends of the cables and requires no tools to repair.

Another object is to provide for the use of a cable ligament between the distal and middle phalange, instead of a rod connection. The ligament bends through two different radii, which gives a bending ratio that is different between the middle and distal phalange.

The present invention can be made entirely non metallic with Kevlar cables (or its equivalent), Torlon bearings (or its equivalent), and carbon pins.

In addition, the palm section of the present invention is shaped for holding tools in three positions.

Another object of the present invention provides for the robotic hand to be driven by a glove over a human hand, or a hand held device that an operator can select specific grasps.

Furthermore, an object of the present invention provides for sensitivity in touch through the use of capacitive sensors for measuring fingertip pressure, allowing for feedback to human driven manipulation.

In another object of the present invention, the robotic hand is realistic in movement and provides various humanlike range of motions, for example, providing for an arc position of the hand and other grasping positions.

These and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

Figure 1:
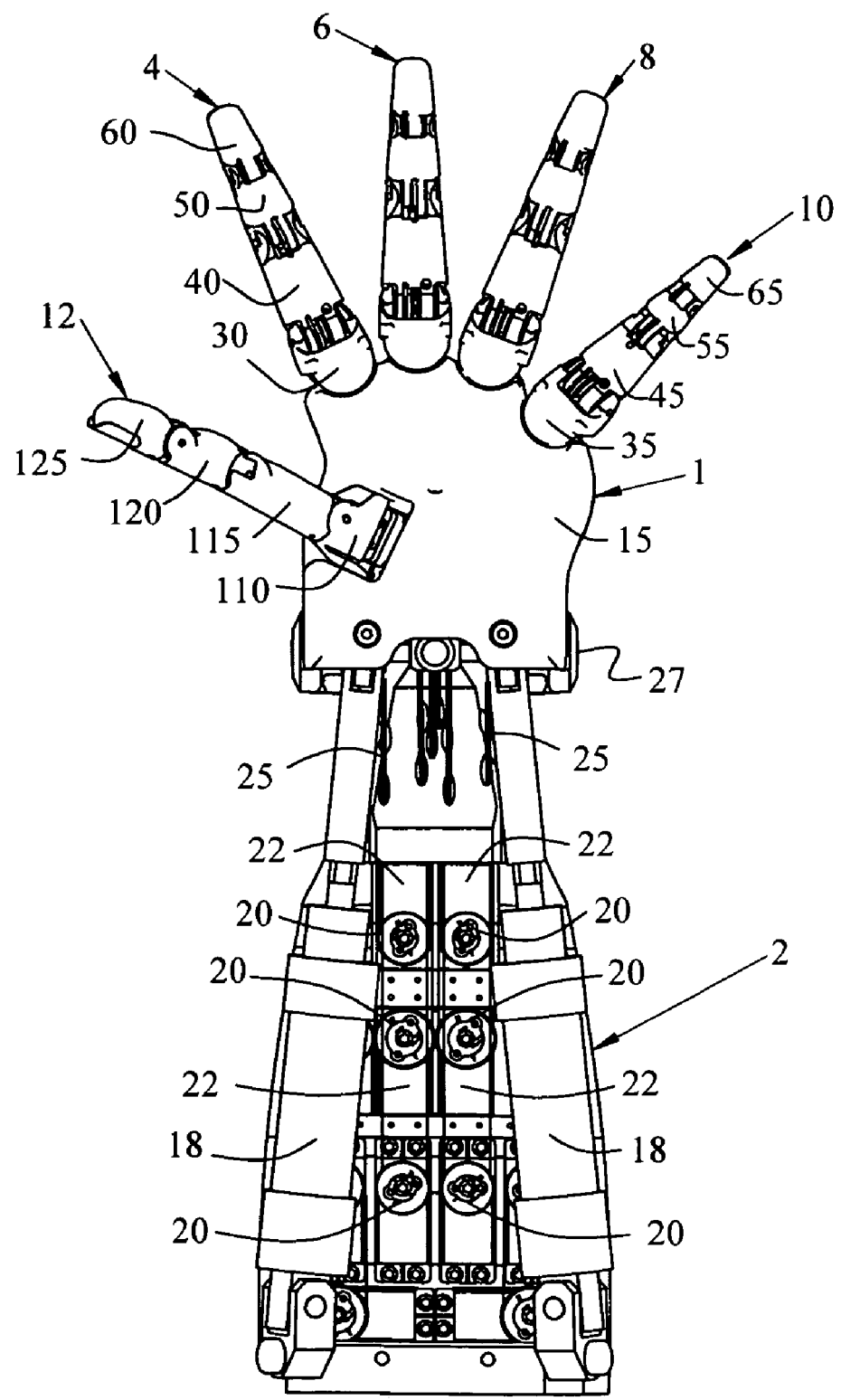
FIG. 1 is a view of a robotic arm and hand assembly with fingers and thumb fully extended according to an embodiment of the present invention.

As illustrated in FIG. 1, there is a robotic hand 1 having a plurality of articulated digits or fingers. In the preferred embodiment there are five digits, an index finger 4, a middle finger 6, ring finger 8, a little finger 10 and a thumb 12. Each finger and thumb further comprises a plurality of phalanges. The index finger 4 comprises a metacarpal phalange 30, connected to a proximal phalange 40, connected to a middle phalange 50, connected to a distal phalange 60. The little finger 10 comprises the same set of phalanges, a metacarpal 35, proximal 45, middle 55 and distal 65. The thumb 12 also comprises the same set of phalanges, a metacarpal 110, proximal 115, middle 120 and distal 125. The preferred embodiment further comprises a palm 15 integrally connected to each of the plurality of digits wherein each digit is removable from the palm section 15. In the preferred embodiment, the palm section 15 is one piece. A system of air cylinders 18 (i.e. pneumatic cylinders), drums 20, and rotational motors 22 (for instance servo motors), located in the robotic arm 2, controls the hand 1 movement. A plurality of cables per each digit are run through respective compressible cable housings 25 and connected throughout the digits over at least a single pulley per digit and provides movement to the various phalanges of each digit. The cables do not slide across any surface except the cable housing. In particular, since the cables roll along the surface of the joints in the digits and/or over the pulley, friction in the cables is minimized. The cables only slide across a liner, preferably a Teflon liner, in the cable housing 25. The cable housings 25 which run across the wrist 27 joint allow a constant length of cable and a compliant springy action at the fingertips. The cable length does not vary as the drums 20 rotate, keeping a constant tension on the cable. The compressible cable housing 25 allows the wrist 27 to move without affecting the position of the digits. The wrist 27 is pivotally connected to the palm 15 through a plurality of wrist bearings. The two pivot axes of the wrist 27 are in the same plane.

Figure 2:
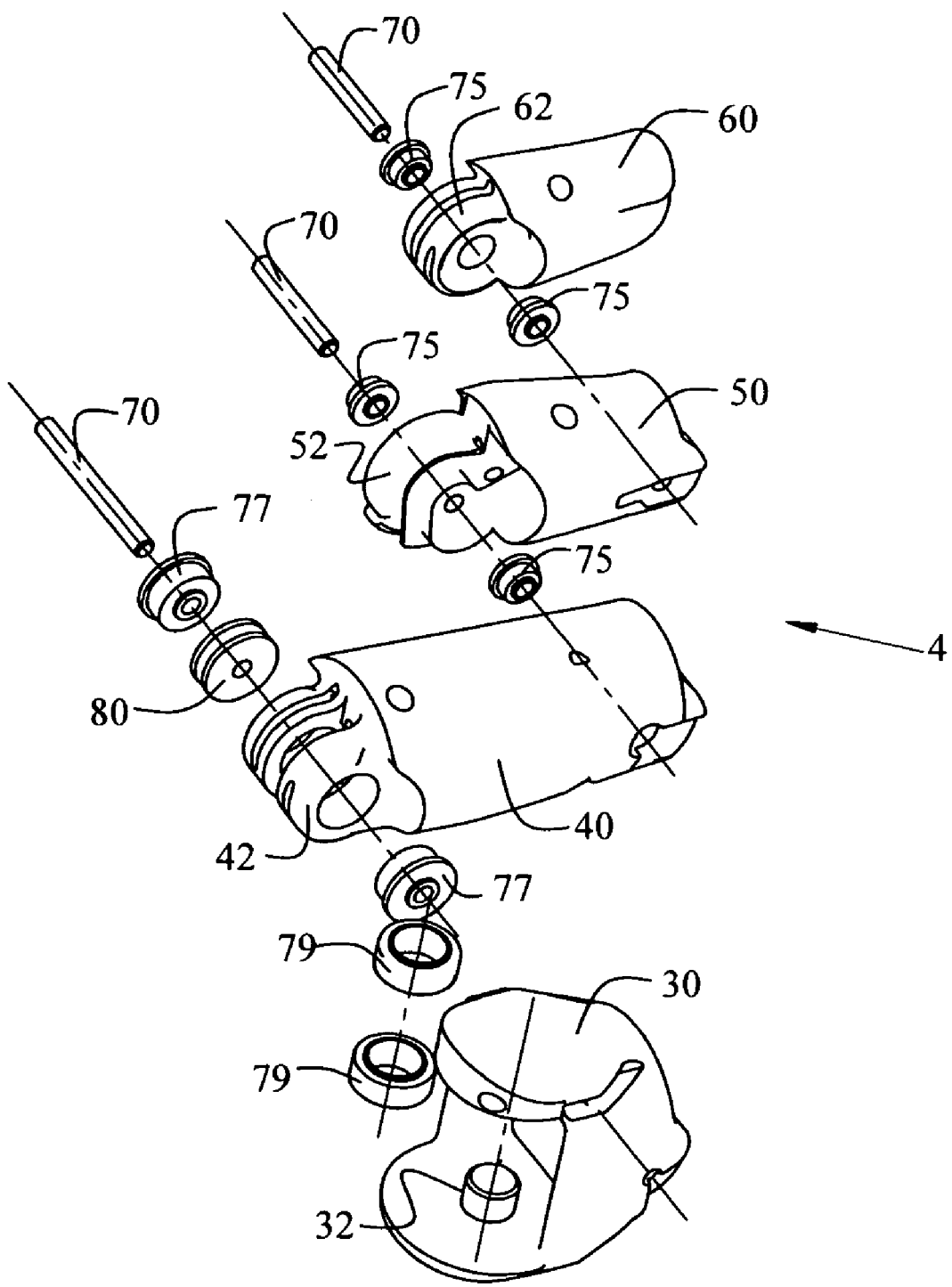
FIG. 2 is an exploded view of a finger assembly, showing placement of bearings and shafts, according to an embodiment of the present invention.

As shown in FIG. 2 a single digit, the index digit 4 of a robotic hand of FIG. 1, is illustrated in an exploded diagram according to an embodiment of the present invention. The metacarpal phalange 30 of the finger is integrally connected to the palm 15 as shown in FIG. 1. The index digit 4 comprises a plurality of phalanges which are the segments between the joints/knuckles which further comprise a plurality of bearings and a plurality of shafts or pins, to hold the digit together. In the preferred embodiment, the digit 4 comprises a metacarpal 30; a proximal phalange 40 connected to the metacarpal 30 via a shaft 70; a middle (or medial) phalange 50 connected to the proximal phalange 40 via shaft 70; and a distal phalange 60 connected to the middle phalange 50 via a shaft 70. Each shaft is held together on each phalange by way of providing bearings 75, 77 around each shaft 70. Each phalange pivots about the shaft 70, assisted by bearings 75, 77. As shown in FIG. 2, distal phalange 60 is connected to middle phalange 50 by bearings 75 provided at each end of a shaft 70 through an aperture of a distal knuckle 62 integral of distal phalange 60 that is formed to engage middle phalange 50. Middle phalange 50 is connected to proximal phalange 40 by bearings 75 provided at each end of a shaft 70 through an aperture of a middle knuckle 52 integral of middle phalange 50 that is formed to engage proximal phalange 40. Proximal phalange 40 is connected to metacarpal 30 by bearings 77 at each end of a shaft 70 through an aperture of a proximal knuckle 42 integral of proximal phalange 40 that is formed to engage metacarpal 30. Between bearings 77, pulley 80 is provided in proximal knuckle 42. The metacarpal 30 comprises side bearings 79 and truncated shafts 32 for engaging with palm section 15, such that the side bearings 79 snap upon the corresponding prong of the palm 15. The side bearings 79 and truncated shafts 32 snap into palm 15, allowing for ease in removal of any digit when necessary for servicing or adjustments and allows for a plurality of cables to pass through the palm 15 into each digit. Therefore, each finger or digit is conveniently removable.

Figure 3:
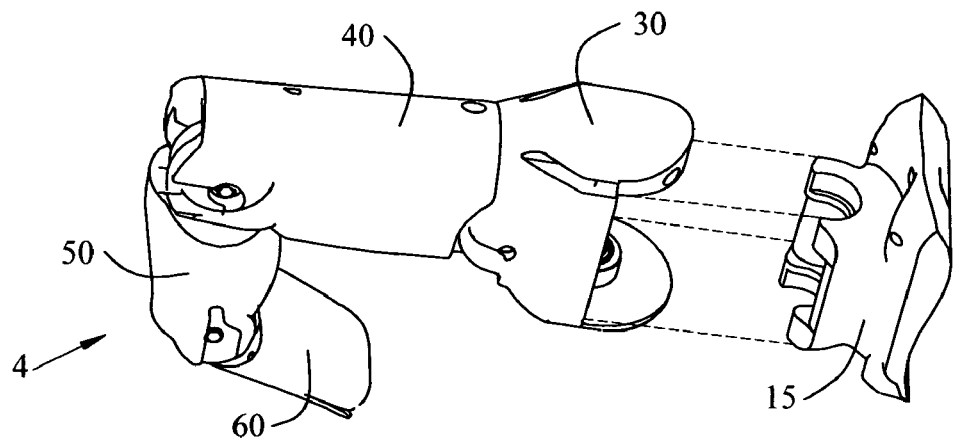
FIG. 3 is a view of an assembled finger detached from the palm section, according to an embodiment of the present invention.
Figure 4:
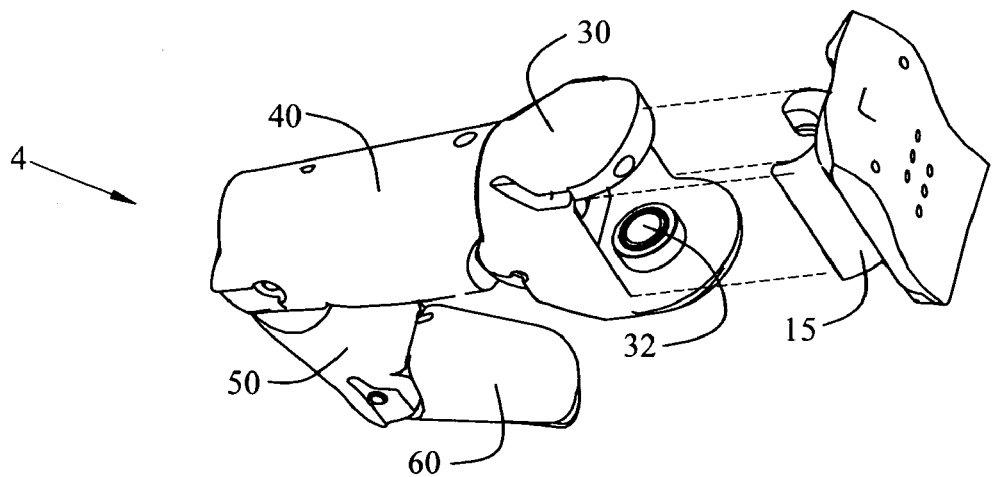
FIG. 4 is a view of FIG. 3 illustrating the cable holes located in the palm section, according to an embodiment of the present invention.

An embodiment of the finger 4 assembly is shown in FIG. 3 and FIG. 4, where the finger phalanges are shown assembled and in the bent position but disconnected from palm section 15. FIG. 3 illustrates the assemble finger 4 where each of the metacarpal 30, proximal phalange 40, middle phalange 50, and distal phalange 60 are connected as an integral finger 4. Palm section 15 is shown to illustrate the inner structure of the palm section 15 for connection with truncated shafts 32 of metacarpal 30. FIG. 4, further illustrates palm section 15 and the connection to truncated shafts 32 of metacarpal 30, and defines openings for the respective cables to move through.

Figure 5:
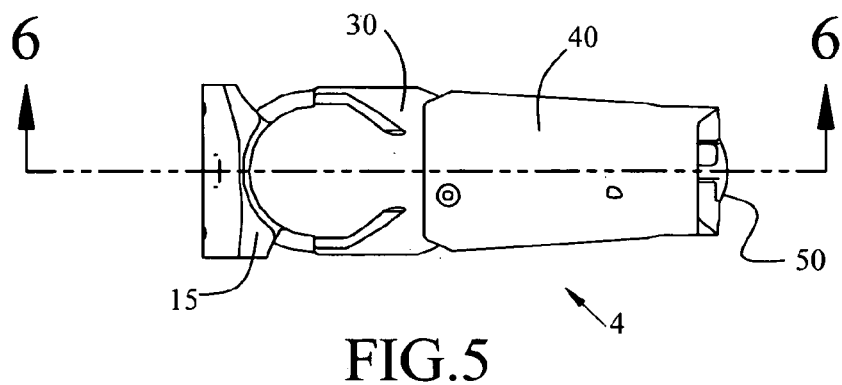
FIG. 5 is a top view of the finger phalange assembly in a constricted position, according to an embodiment of the present invention.
Figure 6:
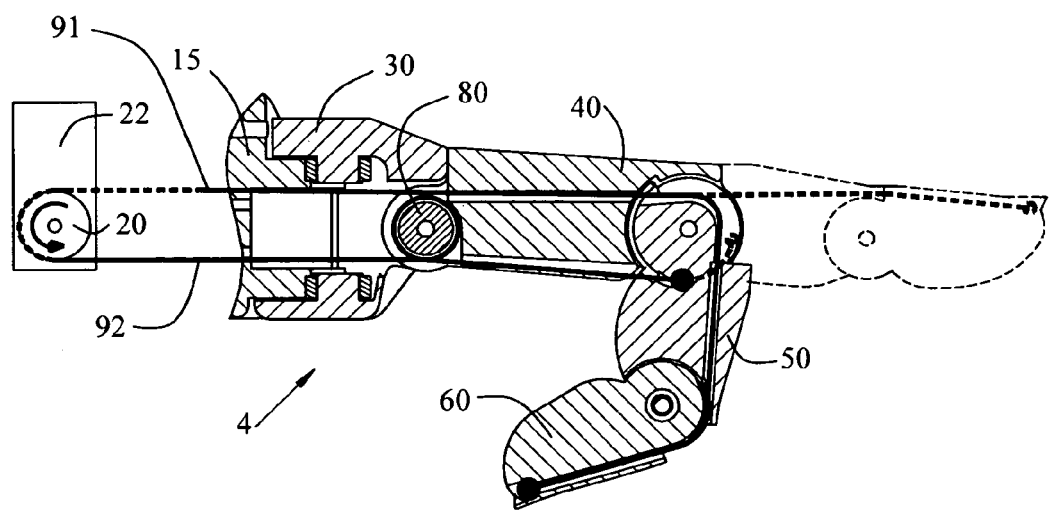
FIG. 6 is a cross-sectional side view of FIG. 5, illustrating how the cable mechanism pulls the distal and middle phalange up, and pulls the middle phalange down, according to an embodiment of the present invention.

FIG. 5 shows a top view of a digit such as index finger 4, illustrated in a bent or constricted position at the middle knuckle 52 according to an embodiment of the present invention. FIG. 6 illustrates the cross-sectional side view of finger 4 along the positional line taken on FIG. 5. As discussed in FIG. 2, each phalange pivots about its respective shaft and knuckle. The plurality of shafts 70 are preferably comprised of steel but may be comprised of any similar or suitable material. A plurality of cables is provided throughout each digit, 4, 6, 8, 10 and 2. As illustrated in FIG. 6, cables 91, 92 are provided for movement of the middle phalange 50 and distal phalange 60. In essence, cables 91, 92 are a single continuous cable, in which cable 91 extends from distal phalange 60 around drum 20 located in arm 2 and wraps around pulley 80 as cable 92, to extend to the middle phalange 50, around the underside of the diameter of middle knuckle 52. For purposes of clarity cables 91, 92, are described as separate cables moving the phalanges in different directions. Cables 91, 92, powered by the rotational motor 22, moved by drum 20 and routed through proximal knuckle 42 over pulley 80, controls movement of the distal and middle phalanges of the finger using rolling friction for control. The cables do not slide across any surface except the cable housing 25. Pulley 80 may comprise of a plastic or metal or other suitable material. In a preferred embodiment, fingers 4, 6, 8, and 10 each comprise seven cables; and thumb 12 comprise eight cables. Having seven cables per finger and eight cables for the thumb, allows for sixteen degrees of freedom in the hand.

FIG. 6 illustrates how cable 91 is pulled around drum 20, and about the topside of the pulley 80 and about the topside of the diameter of middle knuckle 52. When engaged, cable 91 pulls the middle phalange 50 and distal phalange 60 in the upward direction (as shown by the dotted image) through rolling friction. Cable 92 is wrapped around pulley 80, crossing on the underside of pulley 80, and extending around the diameter of middle knuckle 52; a reversal of the pull causes middle phalange 50 to move in the downward direction. At both points of contact with the pulley and middle knuckle 52, cable 92 moves middle phalange 50 with rolling friction. Cable 92 pulls middle phalange 50 in the downward direction, by wrapping about pulley 80, which prevents rubbing on the metacarpal 30 when moved in the down position. Cables 91, 92 and all of the plurality of cables used throughout the hand 1 wrapped around or about a pulley such that no sliding friction occurs, and the movement uses rolling friction.

Figure 7:
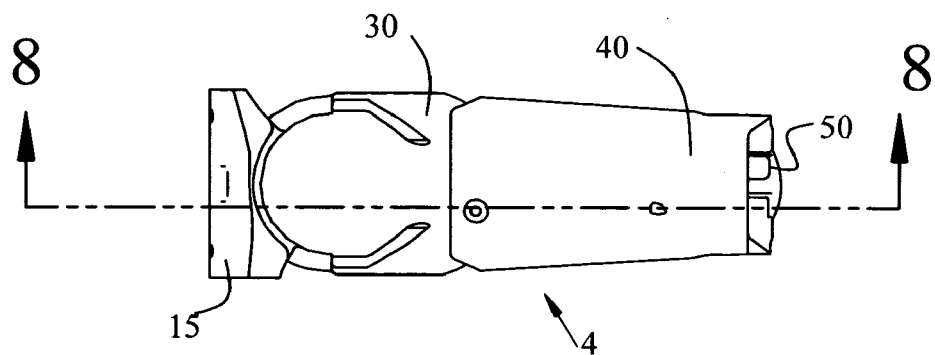
FIG. 7 is a top view of the finger phalange assembly in a constricted position, according to an embodiment of the present invention.
Figure 8:
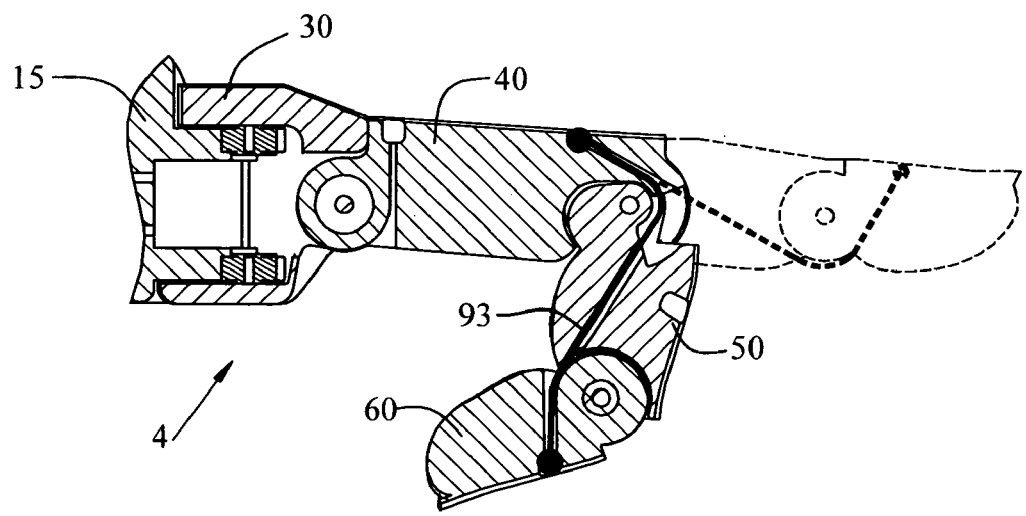
FIG. 8 is a cross-sectional side view of FIG. 7, illustrating how the cable ligament pulls the distal phalange down, according to an embodiment of the present invention.

FIG. 7 shows a top view of a digit such as index finger 4, illustrated in a bent or constricted position at the middle knuckle 52, according to an embodiment of the present invention. FIG. 8 illustrates the cross-sectional side view of finger 4 along the positional line taken on FIG. 7. FIG. 8 demonstrates the location of cable 93 extending from the proximal phalange 40, over the diameter of middle knuckle 52 and underneath the diameter of distal knuckle 62. Cable 93 is the ligament cable, which when engaged, pulls distal phalange 60 in a downward direction using rolling friction. When cable 92 as shown in FIG. 6, pulls down the middle phalange 50, cable 93 pulls distal phalange 60 downward as a function of the diameters of the middle knuckle 52 and the distal knuckle 62. The ligament bends through two different radii, which gives a bending ratio that is different between the middle phalange 50 and the distal phalange 60. For instance, the middle phalange 50 may bend 90 degrees and the distal phalange 60 will only bend 60 degrees similar to a real finger. In the preferred embodiment, the cables have a large bend radii of no smaller than approximately half the diameter of the finger. Such a large bend radii allows the use of larger and stronger cables for greater grip strength. In addition, there is no backward bends of the cables which ensures for greater life of the cables.

Figure 9:
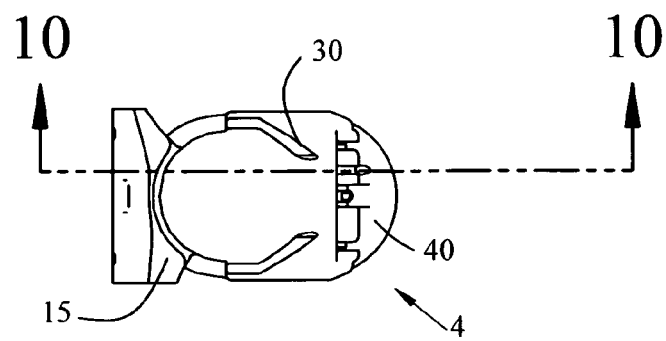
FIG. 9 is a top view of the finger assembly with the finger pointed completely down at the metacarpal phalange, according to an embodiment of the present invention.
Figure 10:
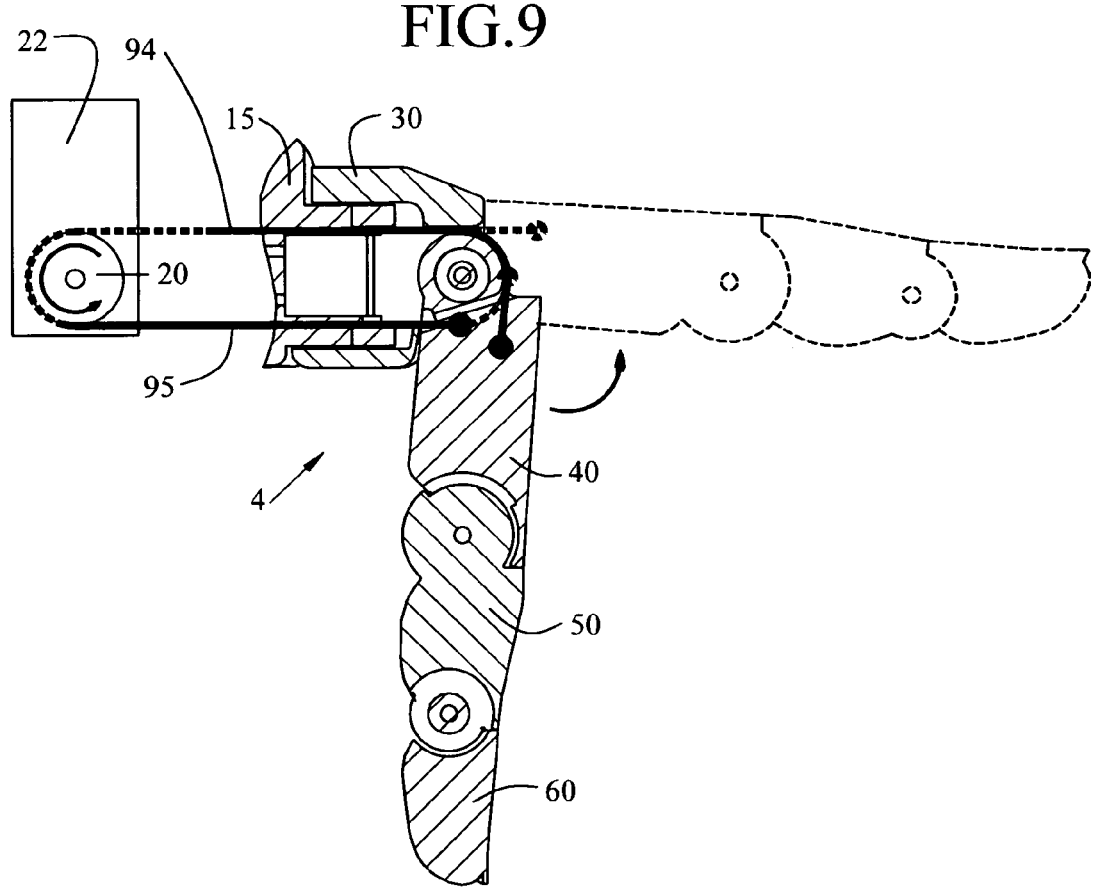
FIG. 10 is a cross-sectional side view of FIG. 9, illustrating how the cable mechanism pulls the proximal phalange down and up, according to an embodiment of the present invention.

According to an embodiment of the present invention, FIG. 9 shows a top view of a digit such as an index finger 4, illustrated in a bent or constricted position at the proximal knuckle 42. FIG. 10 illustrates the cross-sectional side view of finger 4 along the positional line taken on FIG. 9. The finger 4 is shown bent down at the proximal knuckle between the metacarpal 30 and proximal 40 phalanges. Drum 20 and rotational motor 22 drive cables 94, 95 that pass through the palm 15 and rotate finger 4 downward at the proximal knuckle 42. Cable 94 is wrapped about the top side of the diameter of the proximal knuckle 42, and using rolling friction to control proximal phalange 40 pulls proximal phalange 40 in the upward direction. Cable 95 is wrapped about the underside of the diameter of the proximal knuckle 42, and using rolling friction to control proximal phalange 40 pulls proximal phalange 40 in the downward direction.

Figure 11:
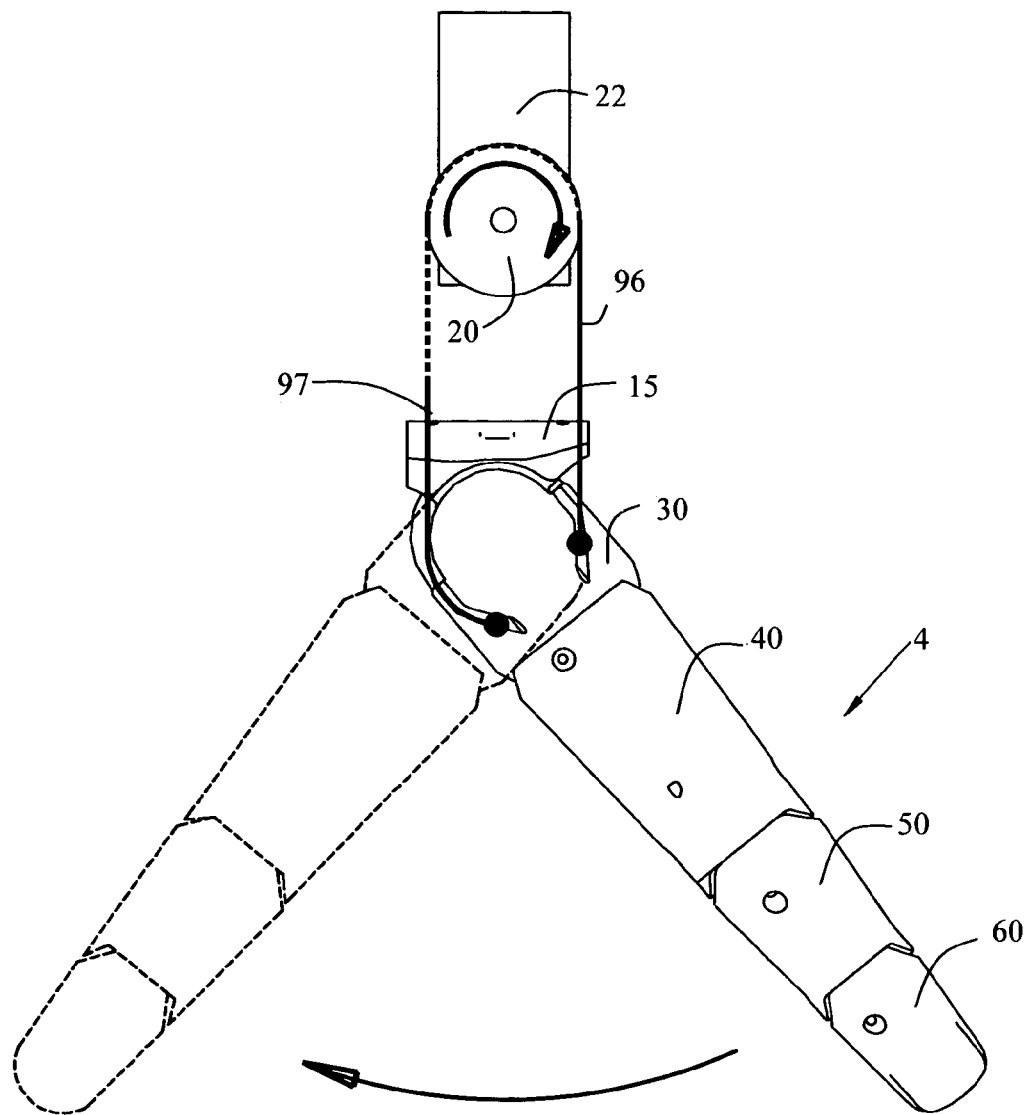
FIG. 11 is a top view of a finger assembly showing the sideways motion at the metacarpal in relation to the movement of the drum, according to an embodiment of the present invention.

As shown in FIG. 11 cable 96 is connected to one side of metacarpal phalange 30 of finger 4, wrapped about drum 20, and extended to the opposing side of metacarpal phalange 30, as cable 97. Through the rotation of drum 10 by rotational motor 22 a range of sideways movement for the entire finger assembly 4 is achieved by the push or pull cables 96 and 97. As cable 96 is pulled in a clockwise direction, finger 4 moves accordingly. As cable 97 is pulled in a counter clockwise direction, finger 4 moves accordingly.

Figure 12:
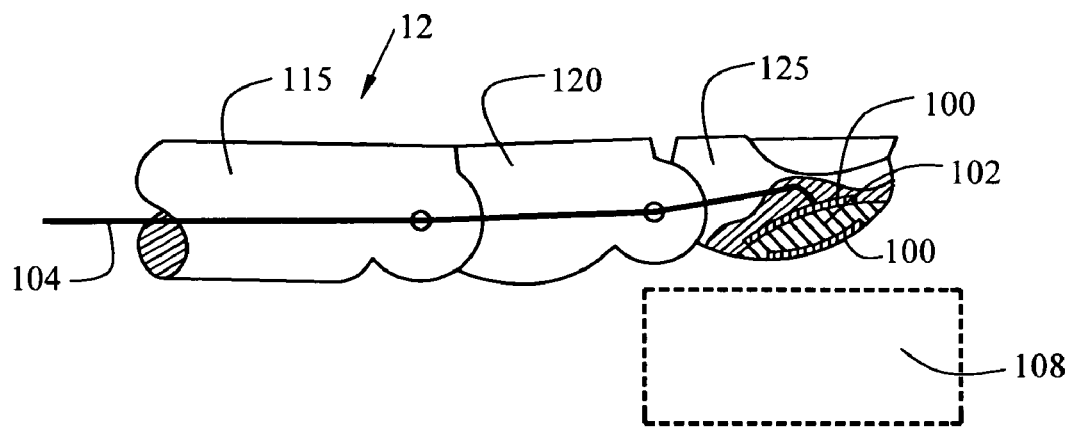
FIG. 12 is a side view of a thumb assembly extended over a hard object, according to an embodiment of the present invention.
Figure 13:
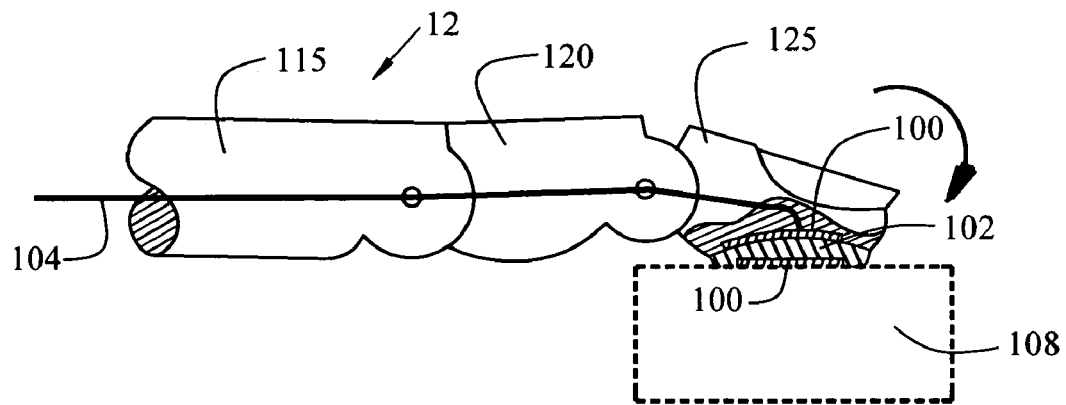
FIG. 13 is a side view of a thumb assembly with the distal phalange constricted to come in contact with the hard object, according to an embodiment of the present invention.

FIG. 12 and FIG. 13 show the distal phalange 125 of the thumb 12 assembly comprising a plurality of capacitive plate pressure sensors 100 and a spongy insulative pad 102 coming into contact with a hard object 108 shown in dotted outline, according to an embodiment of the present invention. FIG. 12 illustrates the capacitor plates 100 located on the distal phalange 125 but can be applied anywhere on the digit for measuring pressure. In FIG. 12, the pressure sensors 100 measure the capacitance between a painted metallic surface on the phalange 125 and a metallic foil lined outer layer on the phalange. In another embodiment of the present invention, the pressure sensors 100 measure the capacity between a painted metallic surface on the phalanges and a metallic foil lined glove (not shown). An embodiment of the present invention further comprises a plurality of coaxial cables which prevent cross talk and having a voltage that is non-linear due to a set of bumps or friction material (not shown) located on the outside of the phalanges and the compressive nature of the closed cell foam in the glove. The frictional material also reduces slippage between the finger and the glove.

As described, the capacitive pressure sensors or capacitor plates 100 on the finger tips such as distal phalange 125, provide a non-linear voltage such that when a finger contacts an object 108, there is a sensitive range for delicate work and a coarse range for gripping large objects. As shown in FIG. 13, distal phalange 125 makes contact with a hard object 108. In the preferred embodiment, this is accomplished through the use of a specific thickness of closed cell foam in the glove and carefully designed bumps on the finger tips. The bumps allow for gripping on the glove and controlling the capacitive sensor response. A grounded metal foil lined glove being one side of the capacitive sensor, and the other side being metal painted phalanges with attached wires, makes the assembly more robust than individual sensors. As shown in FIGS. 12, 13, the attached capacitor's electrical wire 104 or wires, run through wire routing guides inside the finger assembly and is connected to the capacitor plate 100.

As discussed, in the preferred embodiment, there is only one pulley 80 per digit 4, 6, 8, 10. The pulley and cable combination gives a torque multiplication at the metacarpal 30 joint increasing the grip strength of the hand 1. A cable (such as cable 91) that runs from the distal phalange 60 to the middle phalange 50 reduces the need for two extra cables per digit.

Figure 14:
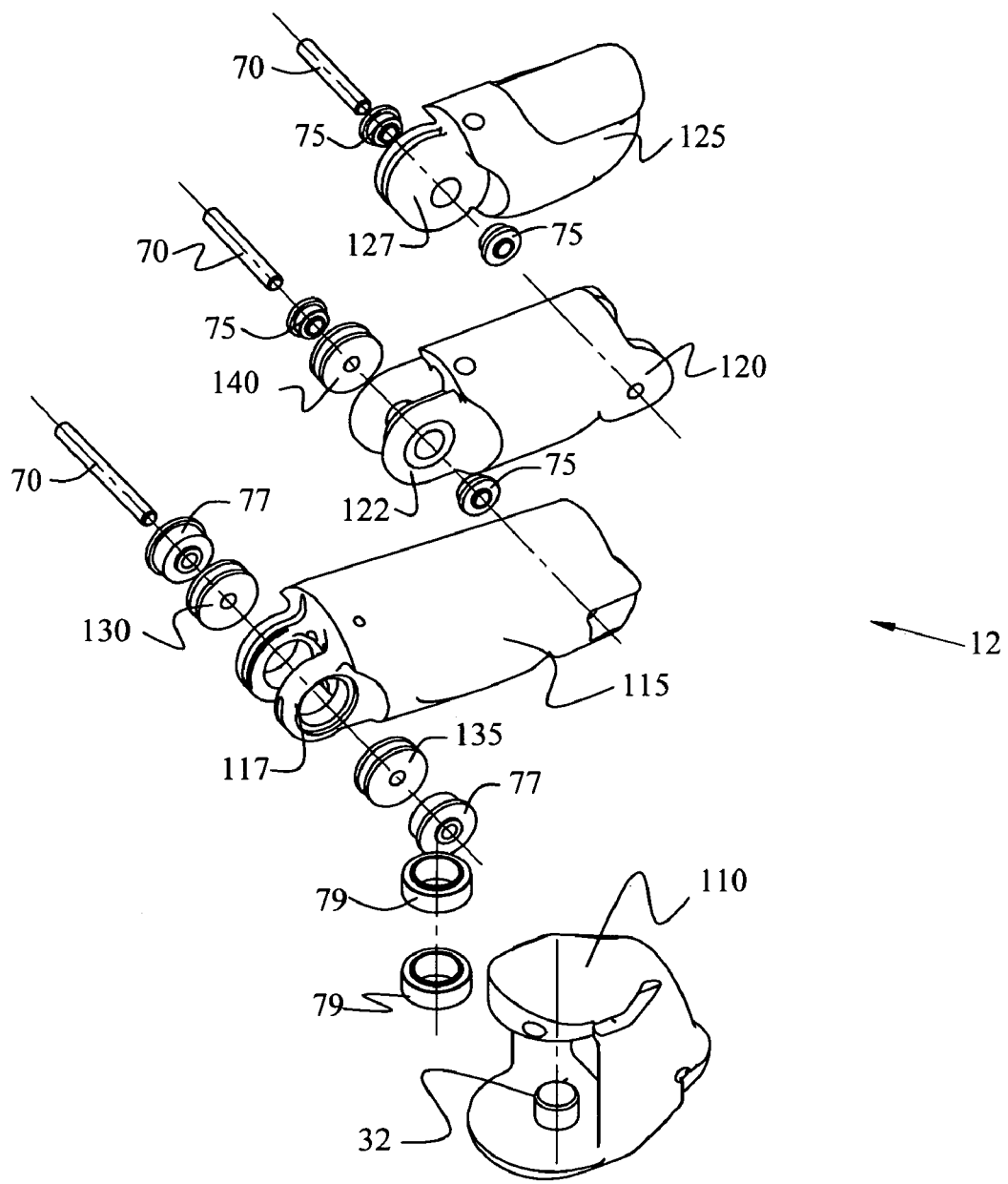
FIG. 14 is an exploded view of a thumb assembly, showing placement of bearings and shafts, according to an embodiment of the present invention.

As shown in FIG. 14, a single digit, the thumb 12 of a robotic hand 1, is illustrated in an exploded diagram according to an embodiment of the present invention. The metacarpal phalange 110 of the thumb is removably connected to the palm 15 of FIG. 1. The thumb 12 comprises a plurality of phalanges and in the preferred embodiment includes a metacarpal 110; a proximal phalange 115 connected to the metacarpal 110 via a shaft 70; a middle (or medial) phalange 120 connected to the proximal phalange 115 via shaft 70; and a distal phalange 125 connected to the middle phalange 120 via a shaft 70. Each shaft is held together on each phalanges by way of providing bearings 75, 77 around each shaft 70. Each phalange pivots about the shaft 70, assisted by bearings 75 and 77. As shown in FIG. 14, distal phalange 125 is connected to middle phalange 120 by bearings 75 provided at each end of a shaft 70 through an aperture of a distal knuckle 127 integral of distal phalange 125 that is formed to engage middle phalange 120. Middle phalange 120 is connected to proximal phalange 115 by bearings 75 provided at each end of a shaft 70 through an aperture of a middle knuckle 122 integral of middle phalange 120 that is formed to engage proximal phalange 115. Proximal phalange 115 is connected to metacarpal 110 by bearings 77 at each end of a shaft 70 through an aperture of a proximal knuckle 117 integral of proximal phalange 115 that is formed to engage metacarpal 110. Pulley 130 and pulley 135 are provided in proximal knuckle 117 between bearings 77. Pulley 140 is provided in middle knuckle 122 between bearings 75. The metacarpal 110 comprises side bearings 79 and truncated shafts 32 for engaging with the palm 15, such that the side bearings 79 snap upon the corresponding prong of the palm 15. The side bearings 79 and truncated shafts 32, snap into palm 15, allowing for ease in removal of the thumb 12 when necessary for servicing or making adjustments. Therefore, the thumb 12 is conveniently removable. In the preferred embodiment, there is provide three pulleys in the thumb 12. As shown, a series of pulleys 130, 135 and 140 are located inside proximal knuckle 117 of proximal phalange 115 and inside middle knuckle 122 of middle phalange 120. Pulleys 130 and 135 reside side by side in proximal phalange 115 and pulley 140 resides in middle knuckle 122. A plurality of cables wrap around or about these pulleys, utilizing rolling friction as opposed to sliding friction.

Figure 15:
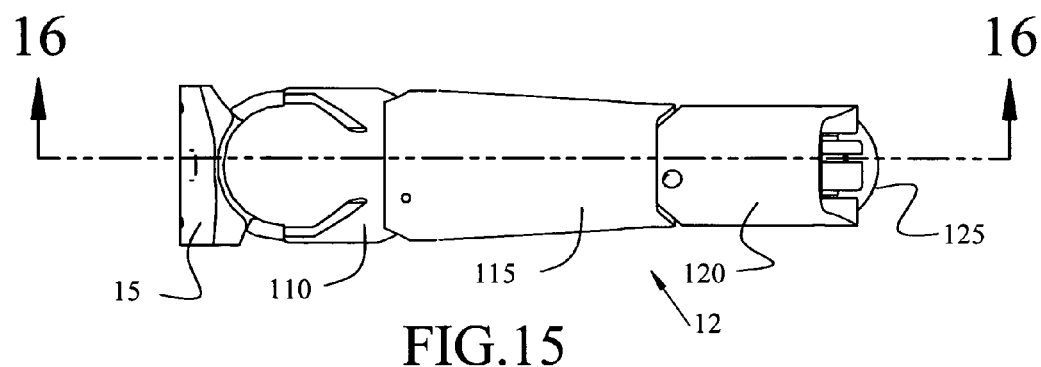
FIG. 15 is a top view of the thumb assembly with the distal phalange in a constricted position, according to an embodiment of the present invention.
Figure 16:
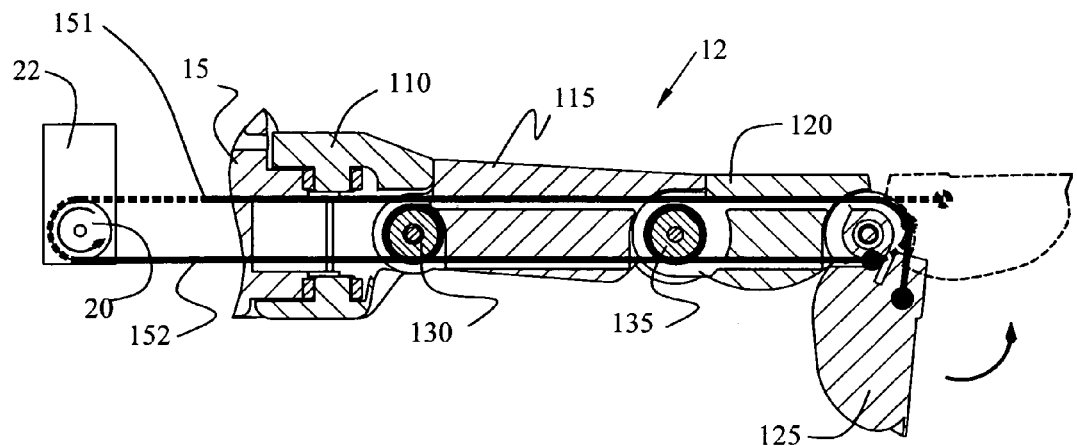
FIG. 16 is a cross-sectional side view of FIG. 15, illustrating how the cable mechanism pulls the distal phalange of the thumb down and up, according to an embodiment of the present invention.

FIG. 15 shows the top view of thumb 12, illustrated in a bent or constricted position at the distal knuckle 127 according to an embodiment of the present invention. FIG. 16 shows the cross-sectional side view of thumb 12 along the positional line taken on FIG. 15 and shows part of the cable mechanism for movement of the thumb 12 according to an embodiment of the present invention. The thumb functions very closely to the movement of other digits on the hand. Cable 151 is set in motion by drum 20 and rotational motor 22 and runs from the distal phalange 125 along the top of pulleys 140 and 130 located at middle knuckle 122 and proximal knuckle 117 respectively. As cable 151 is engaged, distal phalange 125 is moved in the upward direction. Cable 152 runs from the underside of the diameter of proximal knuckle 117, wraps around pulley 140 by crossing at the underside of pulley 140 and wraps around pulley 130, crossing at the underside of pulley 130 to drum 20. As cable 152 is engaged, the movement of distal phalange 125 is controlled in the downward direction.

Figure 17:
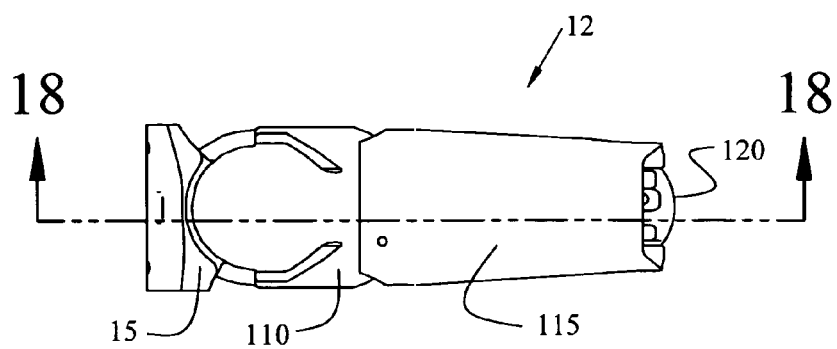
FIG. 17 is a top view of the thumb assembly with the distal and middle phalanges in a constricted position, according to an embodiment of the present invention.
Figure 18:
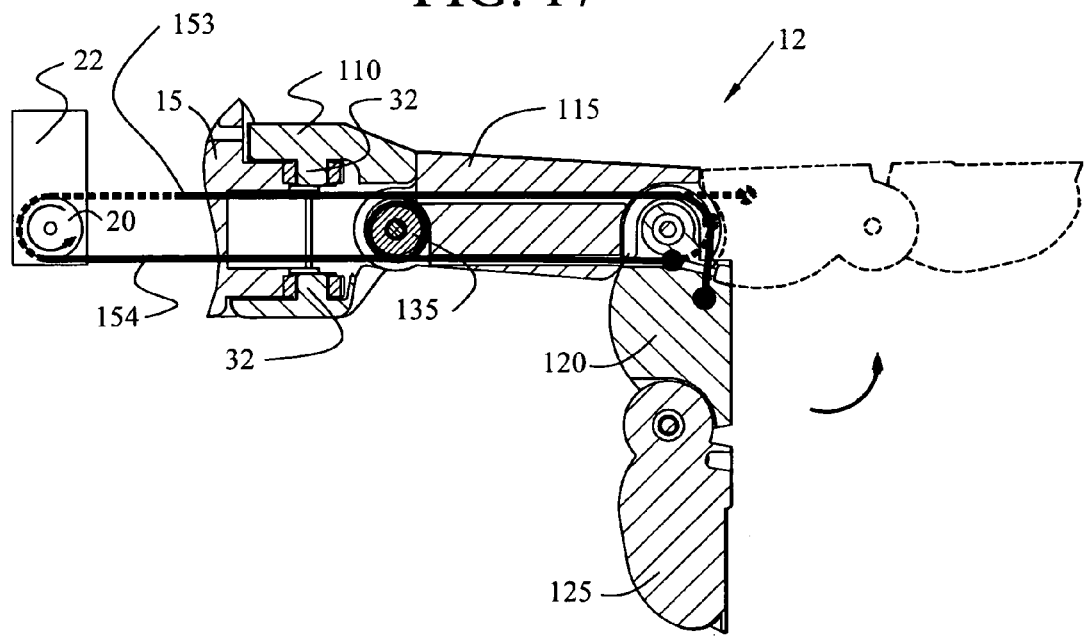
FIG. 18 is a cross-sectional side view of FIG. 17, illustrating how the cable mechanism pulls the middle phalange of the thumb down and up, according to an embodiment of the present invention.

FIG. 17 shows the top view of thumb 12, illustrated in a bent or constricted position at the middle knuckle 122 according to an embodiment of the present invention. FIG. 18 shows the cross-sectional side view of thumb 12 along the positional line taken on FIG. 17 and shows part of the cable mechanism for movement of the thumb 12 according to an embodiment of the present invention. Cable 153 is set in motion by drum 20 via rotational motor 22 and runs from the middle phalange 120 along the top of the diameter of middle knuckle 122 and along the topside of pulley 135 located at the proximal knuckle 117. As cable 153 is engaged, middle phalange 120 is moved in the upward direction. Cable 154 runs from the underside of the diameter of middle knuckle 122, wraps around pulley 135 by crossing at the underside of pulley 135 toward drum 20. As cable 154 is engaged, the movement of middle phalange 120 is controlled in the downward direction.

Figure 19:
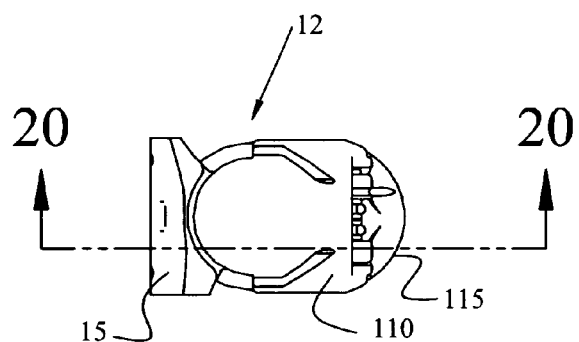
FIG. 19 is a top view of the thumb assembly in a constricted position at the metacarpal phalange, according to an embodiment of the present invention.
Figure 20:
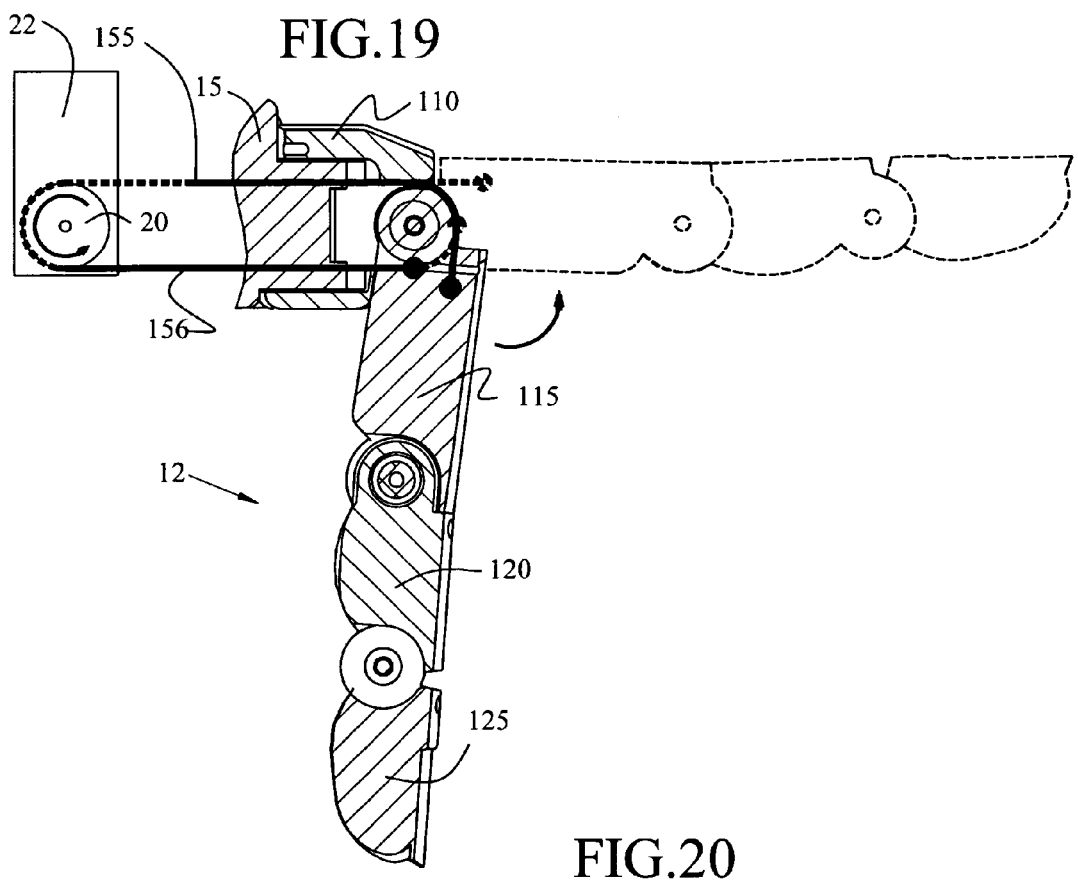
FIG. 20 is a cross-sectional side view of FIG. 19, illustrating how the cable mechanism pulls the proximal phalange of the thumb down and up, according to an embodiment of the present invention.

FIG. 19 shows the top view of thumb 12, illustrated in a bent or constricted position at the proximal knuckle 117 according to an embodiment of the present invention. FIG. 20 shows the cross-sectional side view of thumb 12 along the positional line taken on FIG. 20 shows part of the cable mechanism for movement of the thumb 12 according to an embodiment of the present invention. Cable 155 is set in motion by drum 20 and rotational motor 22 and runs from proximal phalange 115 along the top of the diameter of proximal knuckle 117 toward drum 20. As cable 155 is engaged proximal phalange 115 is pulled in the upward direction. Cable 156 runs from the underside of the diameter of proximal knuckle 117 toward drum 20. As cable 156 is engaged, the movement of proximal phalange 115 is controlled in the downward direction.

In the preferred embodiment of thumb 12, there are eight cables controlling the movement of thumb 12 through the use of three pulleys. Six cables have been discussed in the above figures for thumb 12. Two cables in the thumb 12 which are not shown, similar to cable 96 and 97 in FIG. 11, control sideways movement of the thumb 12 by controlling movement of the metacarpal 110. In addition, a preferred embodiment comprises four drum drives 20 engaged with the eight cables. As in the fingers, the cables of the thumb 12 do not slide across any surface except the cable housing, and uses rolling friction.

Figure 21:
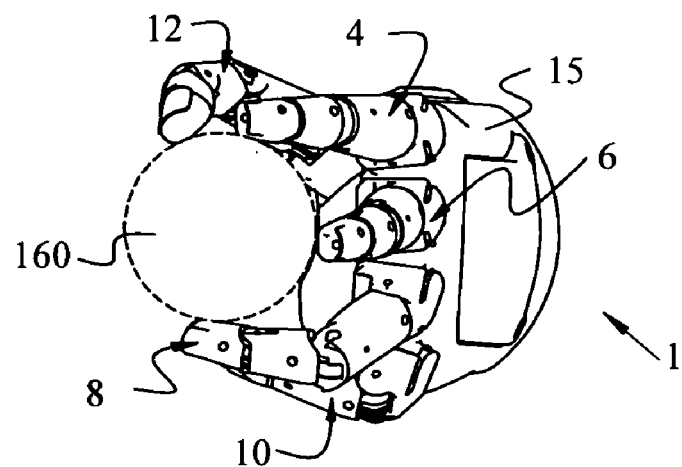
FIG. 21 is a top view of a robotic left hand grasping an object according to an embodiment of the present invention.
Figure 22:
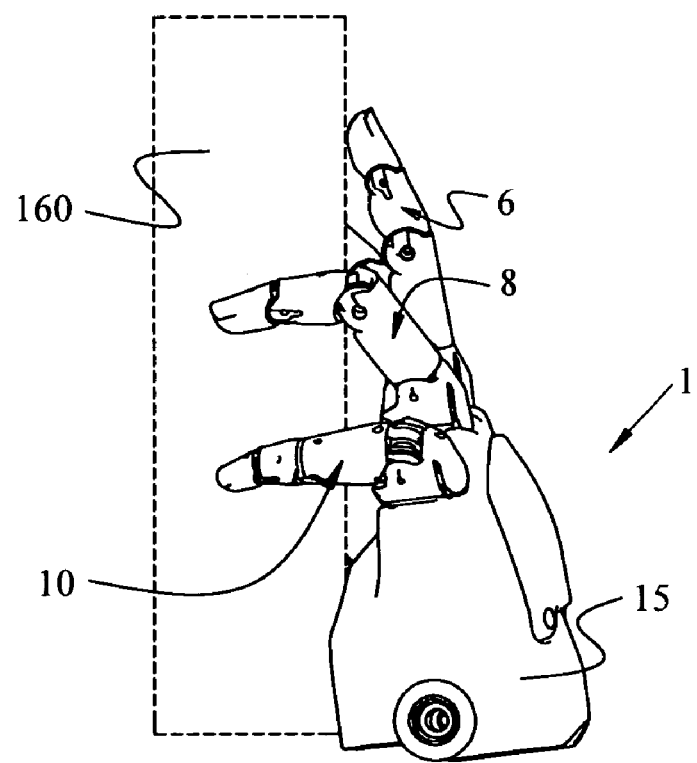
FIG. 22 is a side view of FIG. 21 grasping an object according to an embodiment of the present invention.

As illustrated in FIG. 21, a top view is shown of a robotic hand 1 grasping an object, in this case a cylindrical object 160 shown in dotted outline. In this embodiment, a left hand 1 is shown comprising a plurality of articulated digits or fingers. In the preferred embodiment there are five digits, the little finger 10, ring finger 8, middle finger 6, index finger 4, and thumb 12. The preferred embodiment further comprises a palm 15 of one piece, integrally connected to each of the plurality of digits wherein each digit is removable from the palm 15. FIG. 22 shows the side view of the hand 1 in FIG. 23. The hand 1 illustrates the human like grasping capabilities made possible by the finger assemblies connected to palm 15 for gripping a variety of objects of different shapes and sizes.

Figure 23:
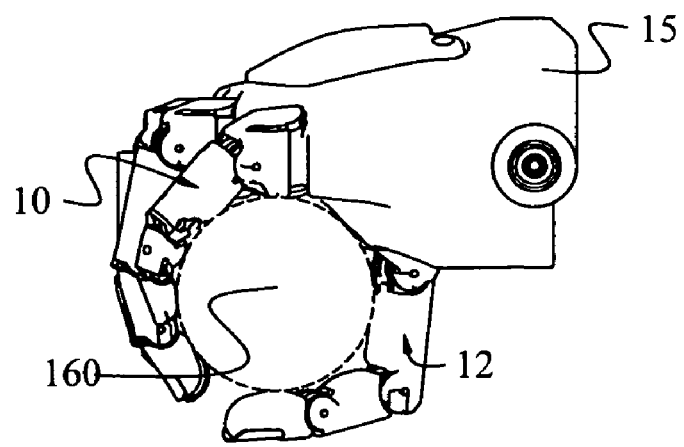
FIG. 23 is a side view of a robotic left hand grasping an object according to another embodiment of the present invention.
Figure 24:
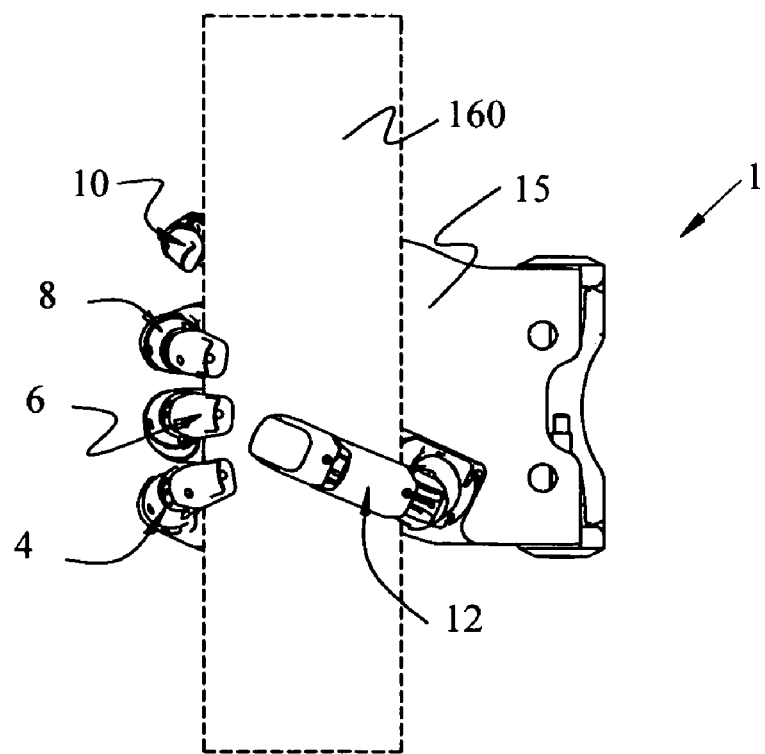
FIG. 24 is a bottom view of FIG. 23 grasping the object, according to another embodiment of the present invention.
Figure 25:
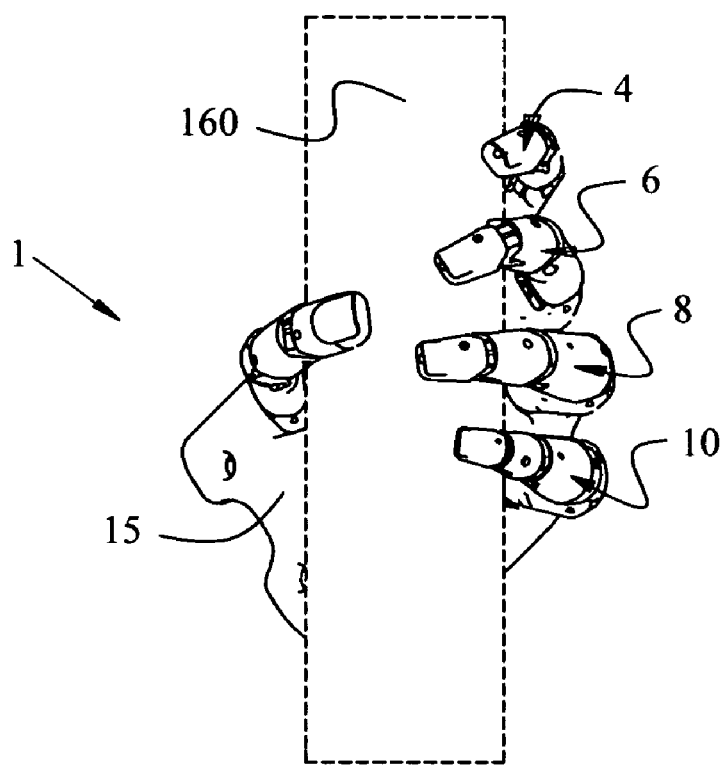
FIG. 25 is an inverted side view of FIG. 24 grasping the object, according to another embodiment of the present invention.
Figure 26:
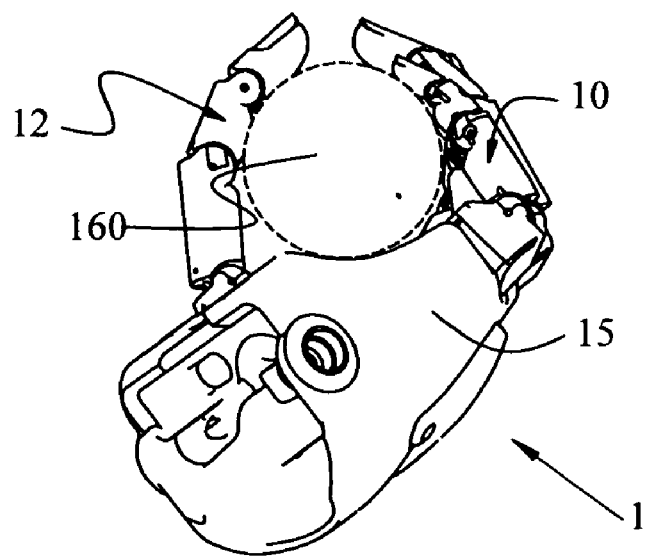
FIG. 26 is a bottom view of FIG. 25, according to another embodiment of the present invention.

This embodiment can be viewed utilizing a different grip arrangement as shown in the bottom view of the robotic hand 1 of FIG. 23. Again, a left hand 1 is shown grasping a cylindrical object 160, in a tighter fashion than in FIG. 21. The bottom view of FIG. 23 is shown in FIG. 24 with the object's 160 left side facing up. FIG. 25 is an inverted side view of FIG. 24, and slightly rotated, showing the arrangement of the fingers in a grasping position. The bottom view of FIG. 25 is illustrated in FIG. 26 which further shows the closeness of the palm 15 and digits around the object 160 for gripping capability.

Figure 27:
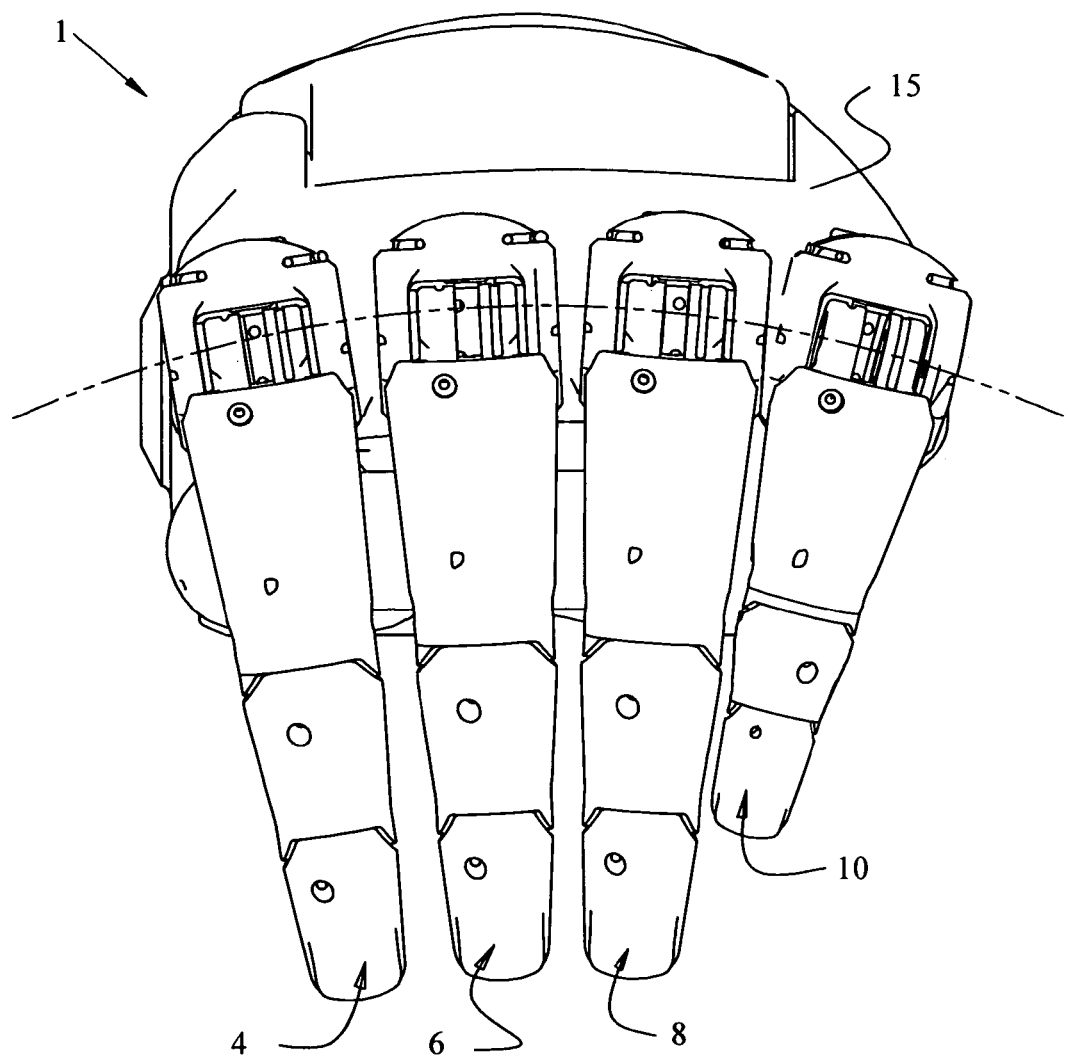
FIG. 27 is a front view of a robotic hand with all fingers constricted downward at the metacarpal phalange, according to an embodiment of the present invention.

As shown in FIG. 27, each digit can be bent about the proximal knuckle 117 at the metacarpal phalange 110 connected to the palm 15 according to an embodiment of the present invention. The arrangement of the digits further illustrates the realistic nature of the hand 1, even in a constricted position.

Figure 28:
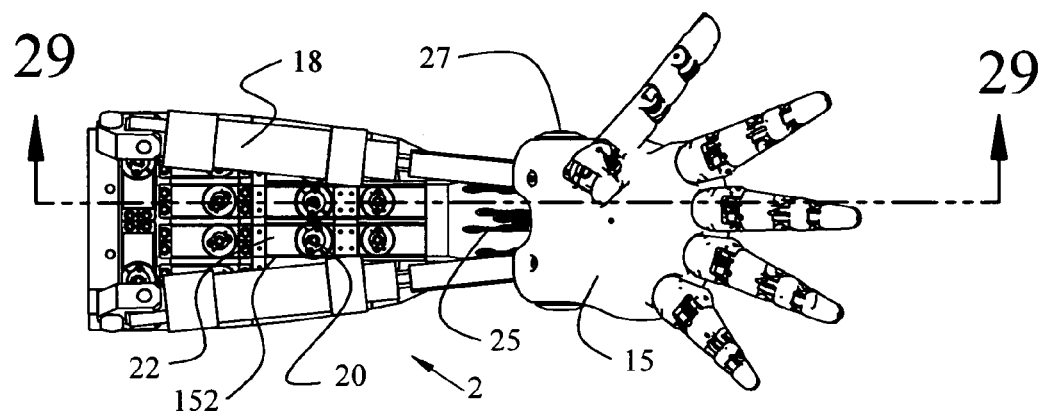
FIG. 28 is a bottom view of a robotic left hand and arm with arm assembly exposed, according to an embodiment of the present invention.

As illustrated in FIG. 28 the hand 1 assembly connects to the forearm 2 assembly, which comprises a plurality of drums 20 and a plurality of rotational motors 22 housed in the forearm assembly. Also housed within the forearm assembly are the air cylinders with linear encoders 18. The air cylinders 18 control movement of the wrist 27 and the linear encoders indicate the position of the wrist. The cable housing 25 runs the respective cables to the individual digits in the hand 1. A plurality of cables per each digit in the hand are run through the compressible cable housing 25 and connected throughout the digits over a plurality of pulleys, connected to various parts of each digit. The cables do not slide across any surface except the cable housing 25, but rather roll across/over the surfaces from the radii of the knuckles and/or pulley(s), thereby minimizing friction in the digits. The cable housings 25 across the wrist 27 joint allow a constant length of cable and a compliant springy action at the fingertips. In addition, the cable housing 25 allows the wrist 27 to independently move from the position of the digits. The compressible cable housing prevents the digits from moving as the wrist 27 moves. The cables are driven with the drums 20 and the cable length does not vary as the drums 20 rotate, providing for constant tension on the cables.

Figure 29:
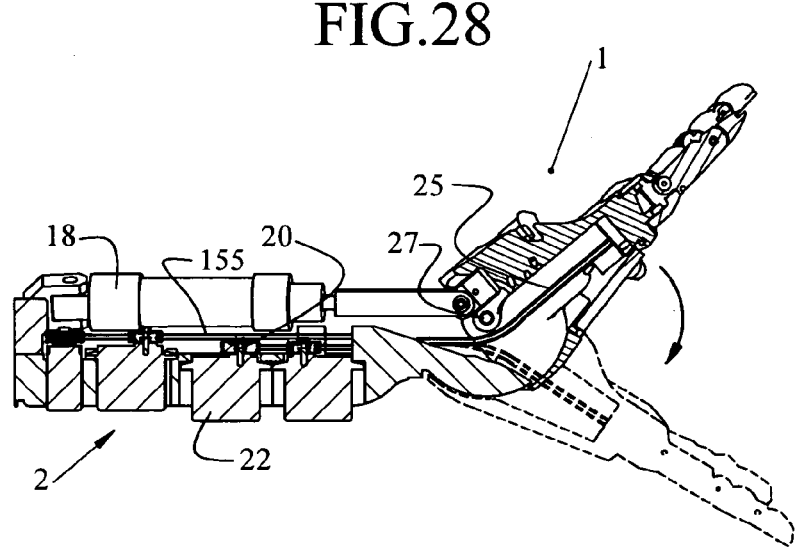
FIG. 29 is a side view of the robotic hand and arm of FIG. 28, illustrating the upward and downward movement of the hand, according to an embodiment of the present invention.
Figure 30:
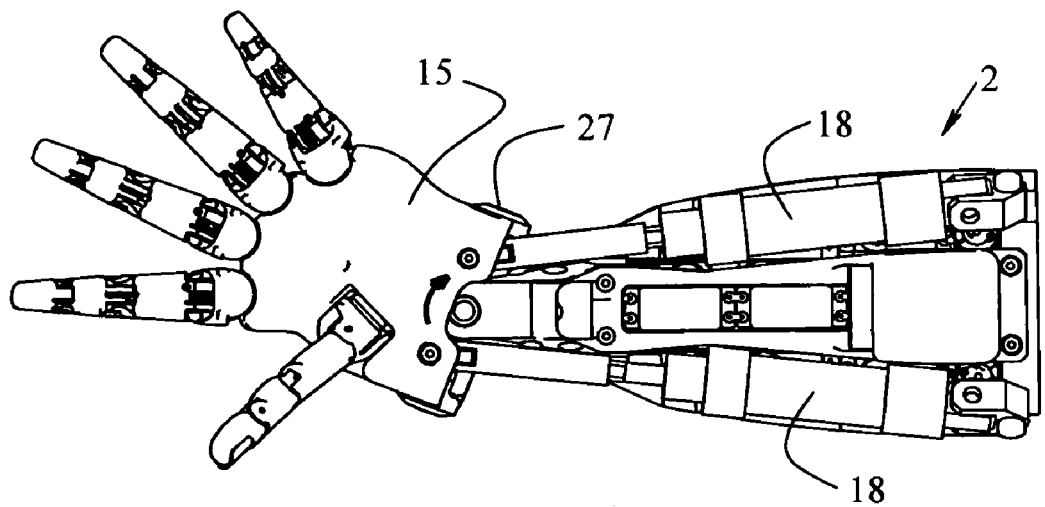
FIG. 30 is a view of the robotic hand and arm of FIG. 28 with the arm assembly enclosed, illustrating a clockwise sideways movement of the hand, according to an embodiment of the present invention.
Figure 31:
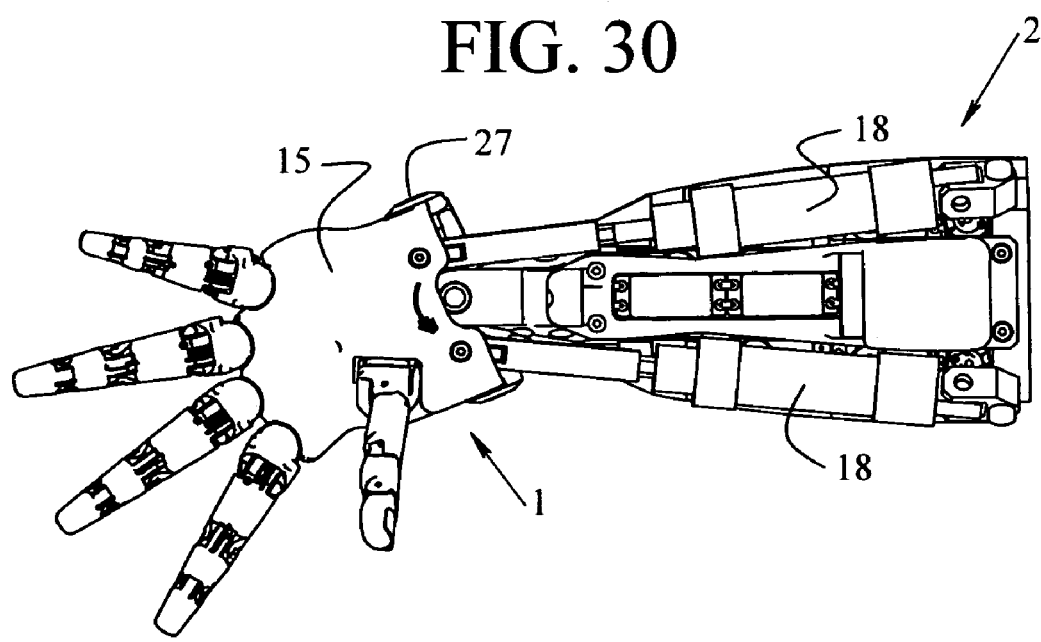
FIG. 31 is a view of the robotic hand and arm of FIG. 30, illustrating a counterclockwise sideways movement of the hand, according to an embodiment of the present invention.
Figure 32:
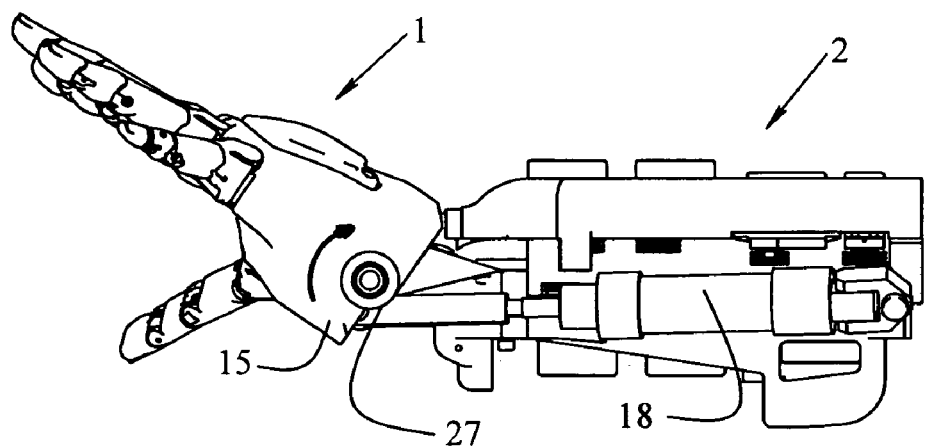
FIG. 32 is a side view of the robotic hand and arm assembly of FIG. 30 with palm side down, illustrating an upward clockwise movement of the hand, according to an embodiment of the present invention.
Figure 33:
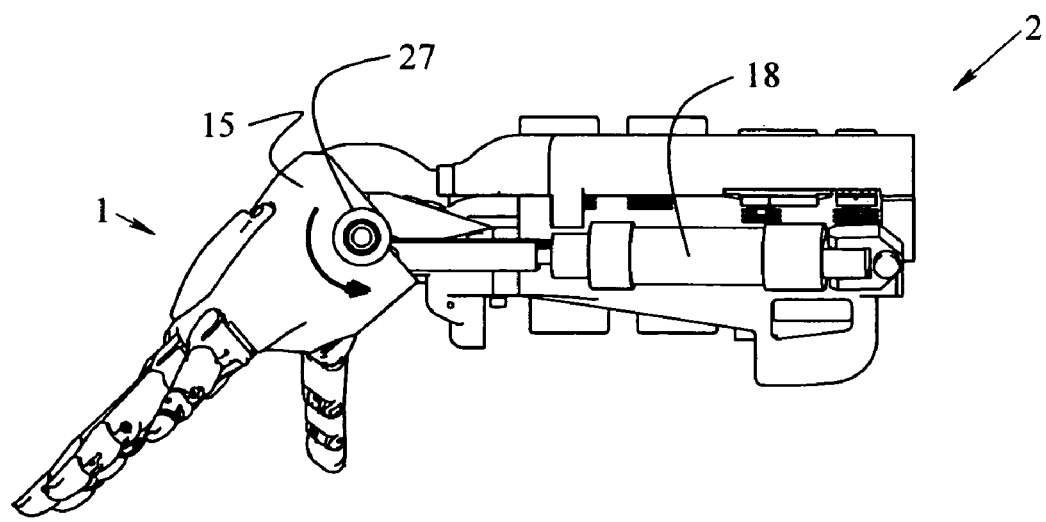
FIG. 33 is a side view of the robotic hand and arm assembly of FIG. 32, illustrating a downward counterclockwise movement of the hand, according to an embodiment of the present invention.

FIG. 29 shows the cross-sectional side view of arm 2 and hand 1 along the positional line taken on FIG. 28. As illustrated, the cable housing 25 is housed through the wrist 27 and through the digits. Air cylinders 18 run from the palm 15 of hand 1 through arm 2. As air cylinders 18 are engaged, the wrist 27 pivots and moves hand 1 in the upward and downward directions. The wrist 27 pivots on two axis residing on the same plane. FIG. 30 and FIG. 31 illustrate how the movement of the side air cylinders 18 rotates the hand assembly clockwise and counterclockwise respectively at the wrist 27 area. In FIG. 32 and FIG. 33, the movement of hand 1 is shown at the wrist 27 with palm 15 facing downward. FIG. 32 illustrates how the push of the air cylinder with linear encoder 18 moves the hand 1 in the upward direction and FIG. 33 shows how the constricting of air cylinder with linear encoder 18 allows the hand 1 to rotate downwards at the wrist 27.

Figure 34:
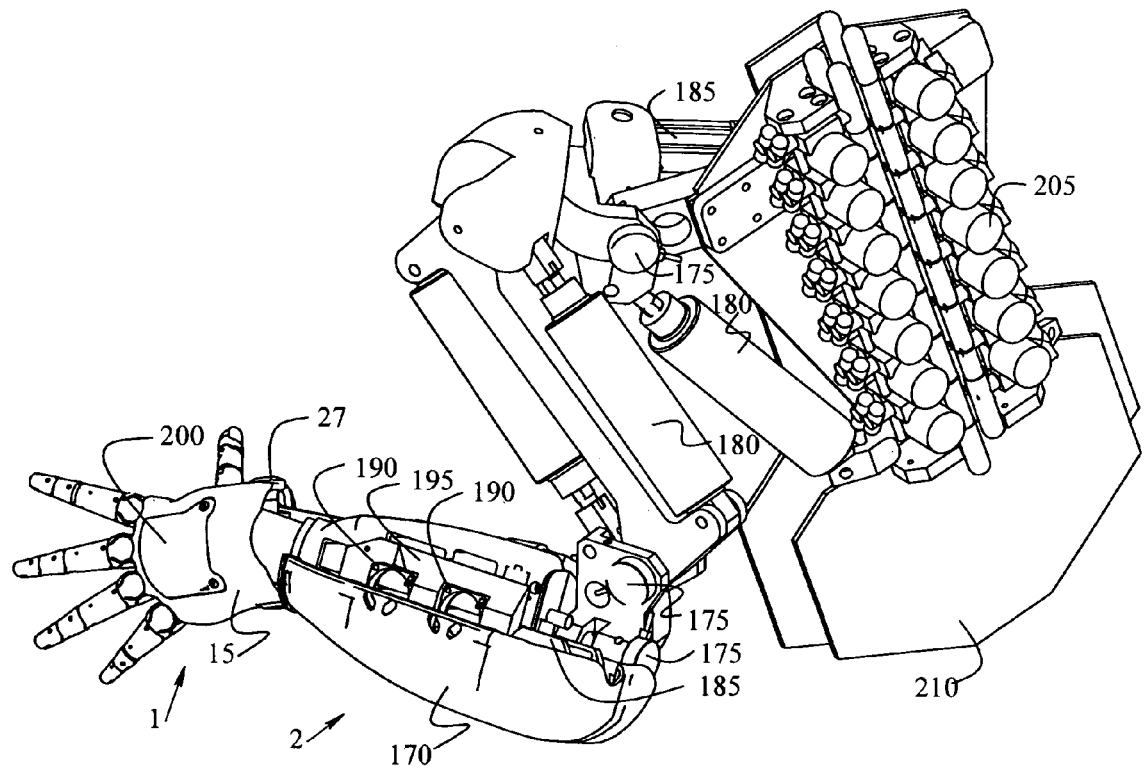
FIG. 34 is a rear perspective side view of a robotic hand and arm connected to a torso according to an embodiment of the present invention.

FIG. 34 illustrates the relationship between the hand 1 and arm 2 assemblies with a torso 210 assembly according to an embodiment of the present invention. A circuit board for fingertip sensors 200 is housed within the top of the hand 1. Forearm 2 is shown with the forearm cover 170 partially removed. A circuit board for rotational motors 195 and a plurality of cooling fans 190 are housed within the forearm 2. Rotary encoders 175 are located at the shoulder and elbow areas which measure the position of a joint. The valves for air cylinders 205 are located on the back of torso 210. A plurality of air cylinders 180 and a plurality of compact air cylinders 185 (designed to take up less linear space) control shoulder and arm movements.

Figure 35:
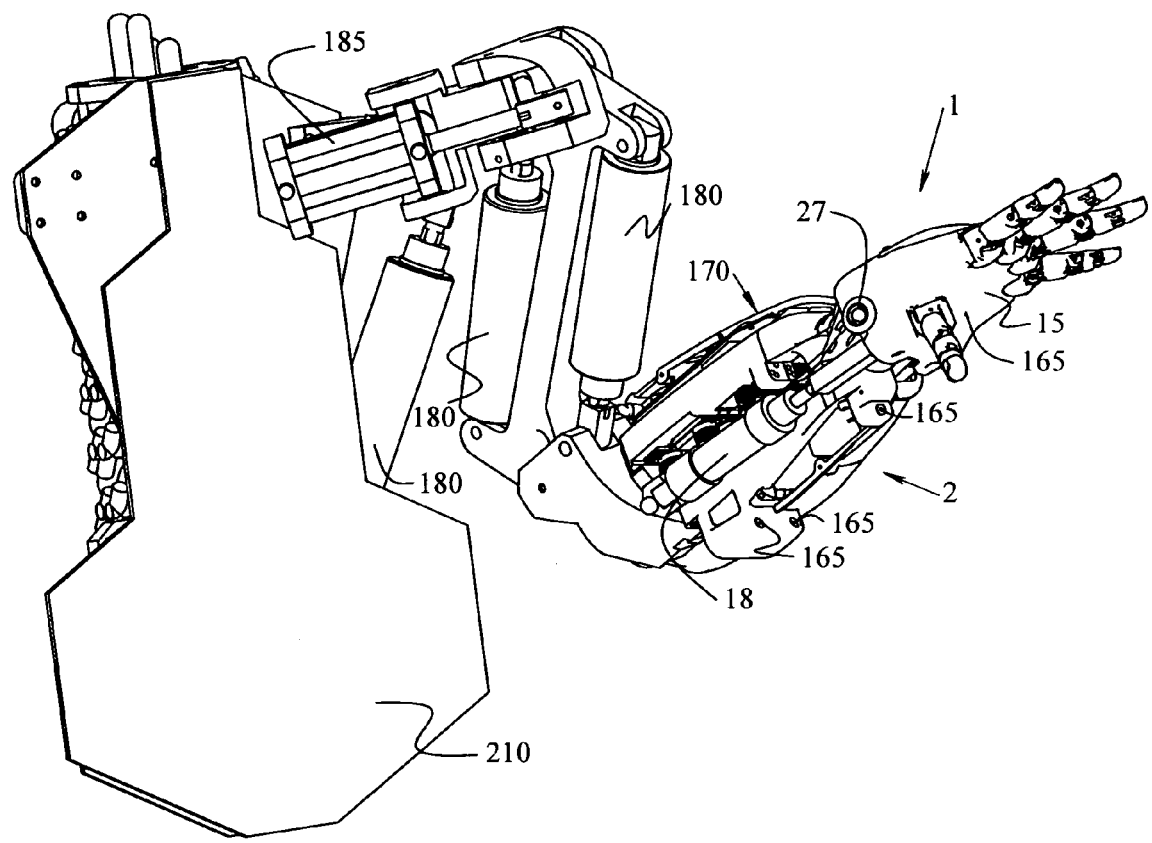
FIG. 35 is a front perspective view of a robotic hand and arm connected to a torso according to an embodiment of the present invention.

FIG. 35 shows a front perspective view of FIG. 34, illustrating the inner side of forearm 2, through the arm and torso 210. As shown, forearm cover 170 is removed to reveal the inner assembly of forearm 2 including the air cylinder 18 which controls hand 1 and wrist 27 movement. A plurality of cameras 165 are provided throughout the hand 1 and arm 2 and may be positioned at various points on the invention.

The embodiments of the present inventions exhibit a simplified structure to other attempts in providing for a lightweight, controlled, dexterous, efficient, easy to manufacture, and powerful robot hands and arms. The embodiments of the present invention incorporate the use of rolling friction in joints of the fingers, allowing a cable to roll across the joint instead of slide across, thus diminishing friction. Since the cables wrap around the pulleys instead of over, the need for additional pulleys or tights bends is eliminated. The preferred embodiment incorporates maintaining a constant cable length to prevent the cable from going slack. Each of the fingers within a hand is removable and comprises truncated shafts 32 molded or pressed into the metacarpal phalanges to retain the side bearings 79 for ease of maintenance. Such structural connection allows room for the cables to enter a palm section of the hand without a shaft obstructing the way. The fingers and each phalange are preferably manufactured from a molding process or other equivalent process used in the industry. The material used can be plastics, metals or polymers such as acrylonitrile butadiene styrene (ABS) or other similar materials.

In the present embodiment, the bearings are also retained, but since the force on the bearings is always in the same direction, the bearings are able to snap into the palm section and the cable tension keeps the fingers in place. When the cable tension is eased, or the cables removed, the finger is removed for maintenance or replacement. Such structure allows the fingers to be built or repaired separately and then installed on the palm. In addition, after loosening one end of each cable, no screw threads or fasteners are required and repair can be accomplished without the use of tools. The cable housing was carefully selected to provide the correct amount of spring force without collapsing under the force of the cable. The compliance of the housing allows the fingers to pick up delicate objects without breaking them. The cable housing is made from an extension spring and a compression spring (or equivalent compliant materials) in series with a PTFE (Teflon) liner to minimize friction on the cables.

Other embodiments of the present invention include the use of remotely driven mechanisms. Prosthetics can be incorporated to use the hand and arm embodiments of the present invention and which can further be extended to other robotic extremities.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments of the foregoing description, but rather is indicated by the appended claims. All changes that come within the meaning and range of equivalents within the claims are intended to be considered as being embraced within the spirit and scope of the claims.

What is claimed is:

1. A robotic apparatus having a mechanical hand for manipulating objects comprising:
   a plurality of articulated and removable digits, each digit having a plurality of phalanges; wherein a plurality of shafts are provided, one shaft between each phalange, connecting each phalange;
   a single pulley residing in each digit;
   a set of cables within each digit, at least some cables of each set of cables engaged about its respective pulley and shafts;
   a cable housing provided about the cables and wherein each set of cables within each digit comprises at least seven cables including a ligament cable; and
   a power supply providing movement to the robotic apparatus;
   wherein the mechanical hand moves by the power supply engaging a pull upon or push upon one or more cables, exerting a force upon a pulley and/or one or more phalanges allowing for the mechanical hand to manipulate with dexterity, control and strength.

2. The robotic apparatus of claim 1, wherein each digit comprises a distal phalange, a middle phalange joined to the distal phalange, a proximal phalange joined to the middle phalange; a metacarpal phalange joined to the proximal phalange; and a palm section joined to each metacarpal phalange of each digit.

3. The robotic apparatus of claim 2, further comprising a plurality of bearings attached at the joining of each phalange and the metacarpal phalange to the palm section.

4. A robotic apparatus according to claim 1, further comprising a robotic arm wherein the power supply resides, the arm connected to the mechanical hand; and a wrist element pivotally connecting the mechanical hand to the robotic arm.

5. A robotic apparatus having a mechanical hand for manipulating objects comprising:
   a plurality of articulated and removable digits, each digit having a plurality of phalanges; wherein a plurality of shafts are provided, one shaft between each phalange, connecting each phalange;
   a single pulley residing in each digit;
   a set of cables within each digit, at least some cables of each set of cables engaged about its respective pulley and shafts;
   a power supply providing movement to the robotic apparatus; wherein the power supply has one or more rotational motors, and further comprising: a plurality of drums connected to the cables and rotated by the one or more motors for pushing or pulling on the cables; and a wrist pivotally connected to the mechanical hand through a plurality of wrist bearings and controlled by a plurality of pneumatic cylinders with encoders;
   wherein the mechanical hand moves by the power supply engaging a pull upon or push upon one or more cables, exerting a force upon a pulley and/or one or more phalanges allowing for the mechanical hand to manipulate with dexterity, control and strength.

6. A robotic apparatus having a mechanical hand for manipulating objects comprising:
    a plurality of articulated and removable digits, each digit having a plurality of phalanges comprising a distal phalange, a middle phalange joined to the distal phalange, a proximal phalange joined to the middle phalange; a metacarpal phalange joined to the proximal phalange; and a palm section joined to each metacarpal phalange of each digit; wherein a plurality of shafts are provided, one shaft between each phalange, connecting each phalange;
    a single pulley residing in each digit;
    a set of cables within each digit, at least some cables of each set of cables engaged about its respective pulley and shafts, wherein at least one of the cables is allowed to bend through two different radii, providing a bending ratio that is different between the middle phalange and distal phalange; and
    a power supply providing movement to the robotic apparatus;
wherein the mechanical hand moves by the power supply engaging a pull upon or push upon one or more cables, exerting a force upon a pulley and/or one or more phalanges allowing for the mechanical hand to manipulate with dexterity, control and strength.

7. The robotic apparatus of claim 6, wherein the middle phalange may bend about 90 degrees and the distal phalange may bend about 60 degrees.

8. A robotic apparatus having a mechanical hand for manipulating objects comprising:
    a plurality of articulated and removable digits, each digit having a plurality of phalanges comprising a distal phalange, a middle phalange joined to the distal phalange, a proximal phalange joined to the middle phalange; a metacarpal phalange joined to the proximal phalange; and a palm section joined to each metacarpal phalange of each digit; including a thumb digit, the thumb digit comprising two or more pulleys wherein at least one pulley is located in between the middle phalange and proximal phalange and a second pulley is located between the proximal phalange and metacarpal phalange; wherein a plurality of shafts are provided, one shaft between each phalange, connecting each phalange;
    a single pulley residing in each digit;
    a set of cables within each digit, at least some cables of each set of cables engaged about its respective pulley and shafts; and
    a power supply providing movement to the robotic apparatus;
wherein the mechanical hand moves by the power supply engaging a pull upon or push upon one or more cables, exerting a force upon a pulley and/or one or more phalanges allowing for the mechanical hand to manipulate with dexterity, control and strength.

9. The robotic apparatus of claim 8, wherein the thumb digit further comprises a third pulley located next to the second pulley between the proximal phalange and metacarpal phalange.

10. The robotic apparatus of claim 9, wherein the thumb digit further comprises eight separate cables.

11. A robotic apparatus having a mechanical hand and arm for manipulating objects comprising.
    a plurality of articulated and removable digits, each digit having a plurality of phalanges including a distal phalange, a middle phalange joined to the distal phalange, a proximal phalange joined to the middle phalange; a metacarpal phalange joined to the proximal phalange, each metacarpal phalange having a plurality of truncated shafts extending from an interior of each metacarpal phalange; and a palm section joined through the truncated shafts to each metacarpal phalange of each digit;
wherein a plurality of shafts are provided, one shaft between each phalange, connecting each phalange;
    a wrist element pivotally connecting the mechanical hand to the arm, controlled by a plurality of pneumatic cylinders;
    a single pulley residing in each digit;
    a set of cables within each digit, at least some of each set of cables engaged about its respective pulley;
    a compressible cable housing provided about the cables running through the wrist element;
    a plurality of drums connected to the cables wherein the mechanical hand moves by rotating the drums which pull upon or push upon one or more cables attached to the drums, exerting a force upon a pulley and/or one or more phalanges; and
    a power supply of one or more rotational motors providing movement to the robotic apparatus; wherein the mechanical hand manipulates with dexterity, control and strength.

12. The robotic apparatus of claim 11, wherein the drums, one or more rotational motors and the pneumatic cylinders are housed within the arm wherein engaging the pneumatic cylinders provides a plurality of rotational movements for the hand through the wrist element.

13. The robotic apparatus of claim 11, further comprising a thumb digit having two or more pulleys wherein at least one pulley is located in between the distal phalange and middle phalange and one pulley is located between the proximal phalange and metacarpal phalange.

14. The robotic apparatus of claim 13, wherein the thumb digit further comprises a third pulley located next to the second pulley between the proximal phalange and metacarpal phalange.

15. The robotic apparatus of claim 11, further comprising a plurality of capacitive pressure sensors for measuring pressure on surfaces of the digits.

16. The robotic apparatus of claim 15, further comprising an outer layer around the robotic hand, the outer layer comprising a compressive, liquid resistant membrane.

17. The robotic apparatus of claim 16, wherein the phalanges comprise a metallic surface, and the outer layer comprises a metallic foil lining such that the pressure sensors measure the capacitance between the metallic surface on the phalanges and the metallic foil lining of the outer layer.

18. The robotic apparatus of claim 15, wherein the pressure sensors provide a non-linear voltage and the robotic hand further comprises a plurality of friction surfaces of the phalanges.

19. A robotic apparatus having a mechanical hand for manipulating objects comprising.
    a plurality of articulated and removable digits including a thumb digit, each digit having a plurality of phalanges comprising a distal, middle, proximal and metacarpal phalange; wherein between each phalange is provided a knuckle integral of each phalange including a distal, middle and proximal knuckle about which the phalange pivots; wherein a plurality of shafts are provided, one shaft between each phalange through each knuckle, and a plurality of bearings are provided about each shaft at each knuckle, the shafts and bearings connecting each phalange;

a palm section attachable to each digit through a plurality of truncated shafts and bearings on an interior of each metacarpal phalange;

a single pulley residing in each digit except for the thumb digit comprising three pulleys;

a set of cables within each digit, wherein particular cables in each of the set of cables engaged about its respective pulley and knuckles encompassing the shafts;

a compressible cable housing provided about the cables;

a plurality of drums connected to the cable housing and cables; and a power supply of one or more rotational motors providing movement to the robotic apparatus;

wherein the mechanical hand moves by rotating the drums which pull upon or push upon one or more cables attached to the drums, exerting a force upon a pulley and/or one or more phalanges allowing for the mechanical hand to manipulate with dexterity, control and strength.

* * * * *